US011263033B2

(12) United States Patent
Boilen et al.

(10) Patent No.: US 11,263,033 B2
(45) Date of Patent: Mar. 1, 2022

(54) USAGE CHECKS FOR CODE RUNNING WITHIN A SECURE SUB-ENVIRONMENT OF A VIRTUAL MACHINE

(71) Applicant: salesforce.com, inc., San Francisco, CA (US)

(72) Inventors: Michael Goldberg Boilen, Kirkland, WA (US); James Bock Wunderlich, San Mateo, CA (US); Nathan Edward Lipke, Denver, CO (US)

(73) Assignee: salesforce.com, inc., San Francisco, CA (US)

( * ) Notice: Subject to any disclaimer, the term of this patent is extended or adjusted under 35 U.S.C. 154(b) by 218 days.

(21) Appl. No.: 16/234,842

(22) Filed: Dec. 28, 2018

(65) Prior Publication Data

US 2020/0210216 A1 Jul. 2, 2020

(51) Int. Cl.
*G06F 9/455* (2018.01)
(52) U.S. Cl.
CPC ...... *G06F 9/45508* (2013.01); *G06F 9/45558* (2013.01); *G06F 2009/4557* (2013.01)
(58) Field of Classification Search
CPC ............. G06F 9/45508; G06F 9/45558; G06F 2009/4557
See application file for complete search history.

(56) References Cited

U.S. PATENT DOCUMENTS

| | | | | |
|---|---|---|---|---|
| 7,293,259 | B1 * | 11/2007 | Dmitriev | G06F 11/3466 |
| | | | | 714/E11.207 |
| 9,703,611 | B1 * | 7/2017 | Christopher | G06F 11/3466 |
| 10,324,741 | B2 * | 6/2019 | Westrelin | G06F 9/4552 |
| 2002/0049963 | A1 * | 4/2002 | Beck | G06F 9/449 |
| | | | | 717/130 |
| 2005/0039187 | A1 * | 2/2005 | Avakian | G06F 11/3476 |
| | | | | 719/310 |

(Continued)

OTHER PUBLICATIONS

Jari et al ; instrumenting Java bytecode, 8 pages (Year: 2005).*

(Continued)

*Primary Examiner* — Wei Y Zhen
*Assistant Examiner* — Brahim Bourzik
(74) *Attorney, Agent, or Firm* — Holland & Hart LLP

(57) ABSTRACT

A system may include an application server and one or more tenants served by the application server. The application server may host a virtual machine with multiple isolated sub-environments. Each tenant of the application server may request to run a program in a tenant-specific sub-environment of the virtual machine. The sub-environments may be configured so the execution of one tenant's code does not affect execution of another tenant's code or the hosting virtual machine, for example, by considering the resources used to execute the code. The application server may implement techniques to securely execute "untrusted" code, programmed using one or more different programming languages, in the sub-environments by enforcing resource restrictions and restricting the sub-environments from accessing the host's local file system. In this way, one tenant's code does not negatively impact execution of another tenant's code by using too many resources of the virtual machine.

20 Claims, 12 Drawing Sheets

(56) References Cited

U.S. PATENT DOCUMENTS

| | | | | |
|---|---|---|---|---|
| 2005/0114848 | A1* | 5/2005 | Choi | G06F 9/45516 |
| | | | | 717/148 |
| 2005/0149719 | A1* | 7/2005 | Kilroy | G06F 8/52 |
| | | | | 713/152 |
| 2008/0288212 | A1* | 11/2008 | Greifeneder | G06F 11/3466 |
| | | | | 702/182 |
| 2009/0234941 | A1* | 9/2009 | Ammerlaan | H04L 67/1008 |
| | | | | 709/224 |
| 2011/0185433 | A1* | 7/2011 | Amarasinghe | G06F 21/577 |
| | | | | 726/25 |
| 2015/0161381 | A1* | 6/2015 | Sun | G06F 21/53 |
| | | | | 726/22 |
| 2016/0110225 | A1* | 4/2016 | Bobroff | G06F 9/45558 |
| | | | | 718/104 |
| 2017/0116007 | A1* | 4/2017 | Cimadamore | G06F 8/315 |
| 2017/0116017 | A1* | 4/2017 | Rose | G06F 9/45558 |
| 2019/0087210 | A1* | 3/2019 | Dowling | G06F 9/30174 |
| 2019/0324880 | A1* | 10/2019 | Rose | G06F 11/3037 |

OTHER PUBLICATIONS

Walter et al ; Advanced Java bytecode instrumentation ; 10 pages (Year: 2007).*

MArek et al ;DiSL: A Domain-Specific Language for Bytecode Instrumentation 12 pages (Year: 2012).*

\* cited by examiner

USAGE CHECKS FOR CODE RUNNING WITHIN A SECURE SUB-ENVIRONMENT OF A VIRTUAL MACHINE

FIELD OF TECHNOLOGY

The present disclosure relates generally to database systems and data processing, and more specifically to usage checks for code running within a secure sub-environment of a virtual machine.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

An application server may execute code for multiple tenants of the application server. The application server may support users developing and executing customized code specific to a tenant to improve the robustness of the supported applications. However, allowing users to run custom code at an application server may limit the ability to enforce protections at the application server. For example, a user may run a block of code at the application server that uses an excessive amount of the server resources (e.g., memory space, computation resources, etc.). This may result in an uneven distribution of the server resources between the tenants, leading to poor performance for one or more of the tenants.

DETAILED DESCRIPTION

Figure 1:
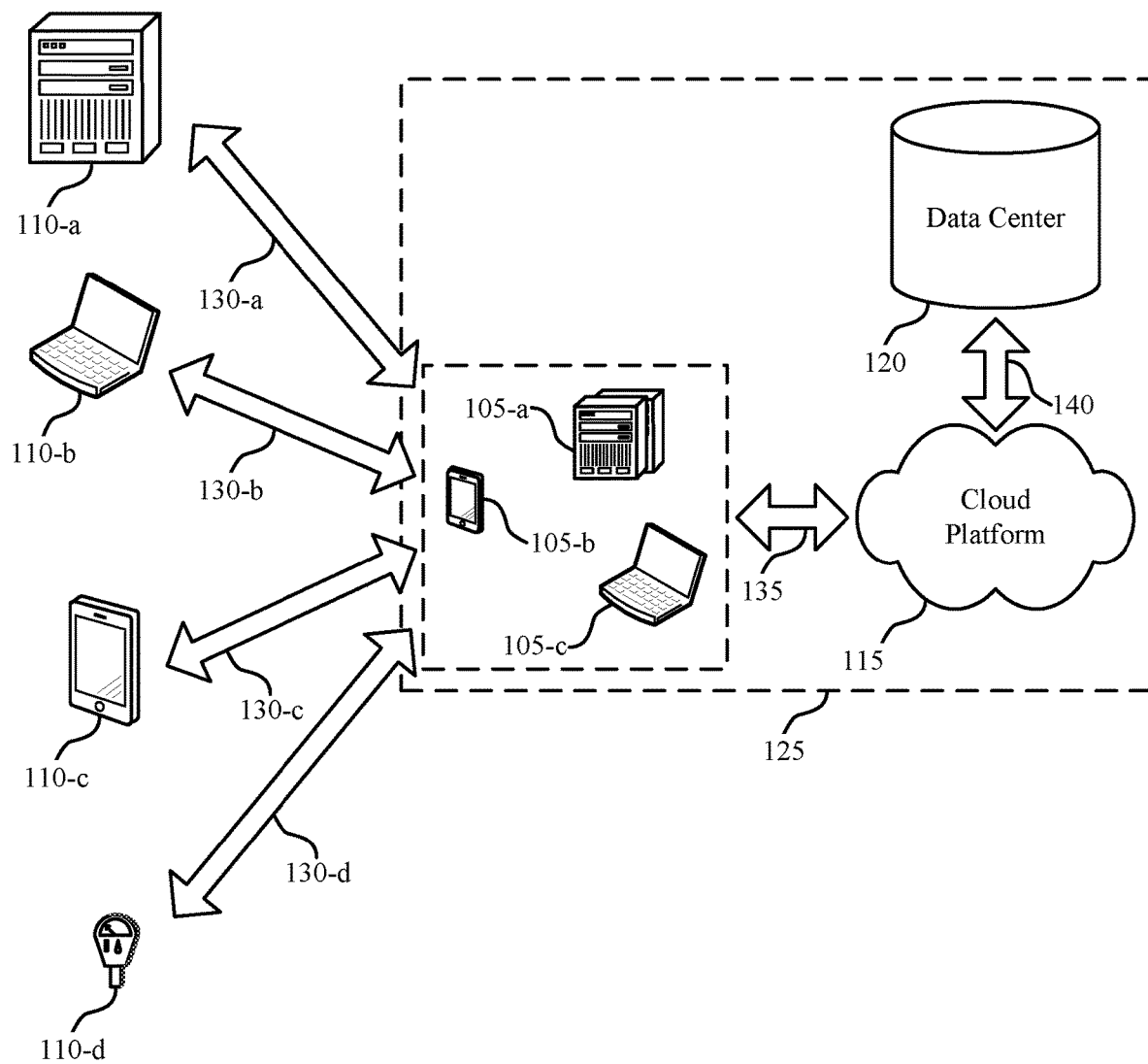
FIG. 1 illustrates an example of a system for data processing that supports usage checks for code running within a secure sub-environment of a virtual machine in accordance with aspects of the present disclosure.

A system, such as a cloud-based system supporting customer relationship management (CRM) solutions, may support an application server which hosts a virtual machine. Multiple tenants of the application server may use the virtual machine. Each tenant may be associated with a customer that has their own code to run in the virtual machine. The virtual machine may be divided into multiple, isolated virtual environments, and each tenant of the application server may be allocated one or more of these private environments to run a program. The sub-environments, referred to as "sandboxes" or tenant-protected spaces, may be configured to be isolated so that one tenant's program does not interfere with another tenant's program or cause problems with the virtual machine at large.

In some systems, a platform running on the application server may limit tenants to running a programming language which is specifically associated with the application server platform. The platform-specific language may ensure security within the virtual machine, for example by providing safeguards against one tenant's code using too many resources of the virtual machine or otherwise affecting the performance or execution of another tenant's code. However, restricting executable code to the platform-specific language may limit functionality of the application server platform. For example, the platform-specific language may provide limited library functionality for using different classes within the sandbox. In some cases, limiting the executable code to the platform-specific language may steepen a learning curve for using the application server platform, as the platform-specific language may be less broadly used than another programming language, such as Java. As such, supporting just the platform-specific language may limit the accessibility of the application server platform to users who have invested time and resources in learning the platform-specific language.

To enhance functionality of the application server platform, the virtual machine may allow tenants to execute programs (e.g., within the sandboxes) written in other programming languages than the platform-specific language. For example, the application server platform may be extended to support running Java code and/or other types of non-platform specific code within the application server in accordance with the application programming interface (API). Java may not include the same types of safety assurances as the platform-specific language. For example, at a conventional server, one sandbox executing Java code could use a disproportionate amount of processing or memory resources for the virtual machine, limiting the available resources for other tenants running code within the virtual machine in other sandboxes. Further, without additional securities, Java code may allow one tenant to access data associated with the host virtual machine or another tenant, rather than restricting the data access to that specific tenant. As such, the sandboxes within the virtual machine may require additional securities and/or checks to ensure fair sharing of resources and secure multi-tenant operation.

The application server described herein may implement techniques to safely execute code, such as non-platform-specific code, within the sandboxes of a virtual machine. The application server may implement an API for tenants to use for running Java code safely within the sandboxes. Java by default may not consider central processing unit (CPU) and heap memory restrictions, but the application server may implement usage checks for the Java code to prevent one sandbox from using a disproportionate amount of processing time or application server memory. Heap memory may refer to dynamically allocated memory, though the resource usage checks may apply to other types of memory as well. When the Java code is compiled into bytecode, the virtual machine may insert additional portions or snippets of bytecode to check the resource usage and enforce static or dynamic resource limits.

In some cases, the application server may identify a class called in the Java code that does not support instrumentation (e.g., bytecode rewriting or adding) in a sandbox and may replace the call with another call to a parallel class that does support instrumentation (or that already includes resource usage checks). Based on this instrumentation support, the application server may modify the bytecode for the parallel classes to use the injected resource usage checks. If executing code in any single sandbox uses a number of resources above a pre-defined or dynamic threshold, the resource usage checks will identify this unfair resource usage and the application server can immediately end the code execution. Additionally or alternatively, the application server may include a security manager which checks whether the current thread is executing in a sandbox or not. The security manager may prevent a thread executing in the sandbox from accessing sensitive functions in core Java classes. The application server may support a whitelist of classes for the sandboxes. A class loader for the sandboxes may not delegate to the parent class loader but instead load a limited set of whitelisted classes which are allowed to run in the sandboxes. The application server may block calls to classes which are not on the whitelist. The application server may use a class locator which can turn a class name into a handle to bytecode, or null. The class locator may locate classes from a disk in a directory, locate classes from one or more Java Archive (JAR) files, or dynamically generate one or more classes. Though the application server may attempt to rewrite bytecode which can cause usage or security issues, the application server may also verify the bytecode after making replacements and rewriting. The verifying may check for any remaining offending or unsafe code which was not fixed with bytecode rewriting. Using any number of the techniques described herein, an application server may support safe execution of code (e.g., unsafe or non-platform specific code) in a multi-tenant virtual machine with isolated sub-environments for each of the tenants.

Aspects of the disclosure are initially described in the context of an environment supporting an on-demand database service. Aspects of the disclosure are further illustrated by and described with reference to apparatus diagrams, system diagrams, and flowcharts that relate to usage checks for code running within a secure sub-environment of a virtual machine.

FIG. 1 illustrates an example of a system 100 for cloud computing that supports usage checks for code running within a secure sub-environment of a virtual machine in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may include an application server which hosts a virtual machine. Multiple tenants of the application server may use the virtual machine. In some cases, a cloud client 105 or a contact 110 may be an example of a tenant of the application server. Each tenant may be associated with a customer that has their own code to run in the virtual machine at the application server. The virtual machine may be divided into multiple separate and private sub-environments, and each tenant of the application server may be allocated one or more of these private environments to run a program. In some cases, this allocation may be performed on the fly at the application server to dynamically manage the load on the virtual machine. The sub-environments, referred to as sandboxes, may be isolated so that one tenant's program does not interfere with another tenant's program or cause problems with the main virtual machine. The tenant may provide their program or code for their program via a network connection 135.

In some conventional systems, an application server platform may limit tenants to running programs created with an application server platform-specific programming language. The platform-specific language may ensure security within the virtual machine, for example by providing safeguards against one tenant's code using too many resources (e.g., above some pre-defined or dynamic resource threshold) or otherwise affecting the performance or execution of another tenant's code within the virtual machine. Apex may be an example of a platform-specific language which has built-in safeguards against resource overuse by a tenant. However, restricting executable code to the platform-specific language may limit functionality of the application server platform. For example, the platform-specific language may provide limited library functionality for using or importing different classes to use in the sandbox (e.g., the platform-specific language may not support open source contributions or certain other functionality). In some cases, limiting the executable code to the platform-specific language may steepen a learning curve for using the application server platform, as the platform-specific language may be less broadly used than another programming language, such as Java. Generally, "safe" code may refer to code written using a platform-specific language, which prevents one sandbox from overutilizing resources or affecting other sandboxes or the hosting virtual machine. "Unsafe" code may refer to code written using a different programming language (e.g., a non-platform-specific language) that may not have default safeguards against using too many resources or affecting other sandboxes or the hosting virtual machine.

In other conventional systems, an application server platform may support running unsafe code at an application server or virtual machine. However, in these cases, a user writing the code may intentionally or accidentally include harmful actions or processes within the code that, when executed, may affect the efficiency or security of the application server or virtual machine. For example, if a user writes very inefficient code for performing a function, executing the code at the application server may tie up a large amount of resources (e.g., memory resources, processing resources, or both), limiting the ability of the application server to serve other users or tenants while this inefficient code is running. For example, if running unsafe code (e.g., Java code) consumes all or a majority of the resources in an application server, the application server may deny service to other users or tenants. Additionally or alternatively, the user may write malicious code to retrieve sensitive information for other tenants served by the application server. For example, because some programming languages support sharing of information between processes, data for other tenants in the multi-tenant environment may be exposed at the application server, allowing one tenant's code to access data for other tenants during execution. Unsafe code run in conventional systems may not include proper safeguards to prevent users from taking these actions at an application server.

To enhance functionality, improve security, and support a multi-tenant system, the system 100 may perform one or more techniques for managing execution of unsafe code at an application server. For example, at the application server platform, the cloud platform 115 and the virtual machine may be configured to support tenants that provide programs (e.g., to be executed within the sandboxes) written in other languages such as Java. In other examples, other types of non-platform specific code may be executed within the application server in accordance with an API of the application server. Some programming languages, such as Java, may not enforce resource usage checks or safeguards which would prevent one sandbox from using a disproportionate amount of resources of the virtual machine. The sandboxes within the virtual machine may have additional securities and/or checks to ensure fair sharing of resources and secure multi-tenant operation. Therefore, the application server may implement techniques to safely execute unsafe code (e.g., including Java code) within the sandboxes of the virtual machine. The application server may implement an API for tenants to use for running unsafe code securely within the sandboxes. Some unsafe code may, by default, not consider CPU or heap restrictions. Therefore, the application server may implement usage checks when executing the unsafe code to prevent one sandbox from using an amount of CPU time or application server memory greater than a resource limit for the corresponding tenant. When the unsafe code is compiled into bytecode, the virtual machine may insert additional bytecode throughout to check the resource usage. If executing code in any single sandbox uses a number of resources above a configured threshold, the resource usage checks will identify this unfair resource usage and the application server can immediately (e.g., upon identifying the resource usage over the threshold) end the code execution. Therefore, using the techniques described herein, an application server may support safe execution of code (e.g., unsafe code or non-platform specific code) in a multi-tenant virtual machine with isolated sub-environments for each of the tenants.

In some cases, the application server may identify a class called in the Java code that does not support instrumentation in a sandbox and may replace the call with another call to a parallel class that does support instrumentation. Instrumentation may refer to bytecode rewriting. For example, the application server may be able to rewrite a class which supports instrumentation, such that the application server can modify the bytecode and inject resource usage checks. Thus, calls to classes which do not support instrumentation may be replaced with calls to similar (e.g., functionally identical) classes which do support instrumentation, such that the application server can inject usage checks into the bytecode.

In some cases, the virtual machine hosting the sandboxes may operate based on Java code (e.g., as a Java Virtual Machine (JVM)). In these cases, the application server may implement some techniques to restrict access of Java code executing in a sandbox from classes used at the hosting virtual machine. In some cases, the application server may include a security manager which checks whether the current thread is executing in a sandbox or not (e.g., detecting internal versus tenant bytecode running in the same JVM). The security manager may prevent a thread executing in the sandbox from accessing sensitive functions in core classes, such as "java.lang.System" classes. In some examples, the application server may support a whitelist of classes for the sandboxes. A class loader for the sandboxes may not delegate to the parent class loader but instead load a limited set of whitelisted classes (e.g., classes granted permissions to run in the sandboxes by an administrative user of the application server). The application server may block calls to classes which are not on the whitelist. The application server may use a class locator which can turn a class name into a handle in bytecode or a null value. The class locator may locate classes from a disk in a directory, the data center 120, memory storage at the cloud platform 115, one or more archived library files (e.g., JAR files), or some combination thereof. Additionally or alternatively, in some cases the class locator may dynamically generate a set of classes. In some cases, the virtual machine may implement wrappers for tenant objects to support access by different programming languages. Furthermore, the application server may verify the bytecode (e.g., after making replacements and/or performing bytecode rewriting to support the usage checks). The verifying may test for any remaining offending or unsafe code which was not fixed with bytecode rewriting and class loading. Additionally, the verifying may involve ensuring that the bytecode can be run by an interpreter without breaking or otherwise affecting the interpreter.

It should be appreciated by a person skilled in the art that one or more aspects of the disclosure may be implemented in a system 100 to additionally or alternatively solve other problems than those described above. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example, a cloud client 105 may be a tenant of the application server and may be assigned a sandbox of the application server platform hosted at the cloud platform 115. In some cases, the cloud client 105 may subscribe to the application server platform and have a consistently managed sandbox, or the sandbox for the cloud client 105 may be generated on the fly at the application server (e.g., based on the cloud client 105 sending programmable code to execute to the application server). The cloud client 105 may have a program to run on the application server platform. The program may be written using Java or another type of unsafe code which does not consider resource usage for the sandbox. The cloud client 105 may run the program in the sandbox, sending the code for the program over the network connection 135 to be run at the application server hosted by the cloud platform 115.

The application server at the cloud platform 115 may receive the unsafe code and implement techniques to safely run the code in the sandbox associated with the cloud client 105. For example, the application server may check whether the classes called in the program are listed in the whitelist for the sandbox. If the program calls a class which is not on the whitelist, the application server may restrict access to that class. In some cases, the application server may notify the cloud client 105 of the call to the restricted class. The application server may utilize a security manager to keep track of whether a thread at the virtual machine is executing code within a sandbox or at a higher level of the virtual machine.

If the virtual machine operates according to Java and the program run in the sandbox is written in Java, the security manager may be used to keep track of whether the executing code is in the sandbox or not. The application server may identify calls to classes in the program which do not support instrumentation. The application server may replace these calls with other calls to parallel classes which do support instrumentation. The application server may generate bytecode for the program and inject resource usage checks into the bytecode. The resource usage checks may ensure that the program, when run in the sandbox, does not use too many resources (e.g., when compared to one or more resource thresholds) or otherwise affect or hinder performance at other sandboxes or the hosting virtual machine in general. If the program does fail the resource usage checks, the application server may stop execution of the program. In some cases, the application server (e.g., via the cloud platform 115 and the network connection 135) may inform the cloud client 105 of the excessive resource usage. The application server may perform an additional validation of the program after making the adjustments or changes to the program. If the program passes the additional validation, the application server may run the program. Otherwise, the application server may notify the cloud client 105 of any remaining problems with the code for the program.

Figure 2:
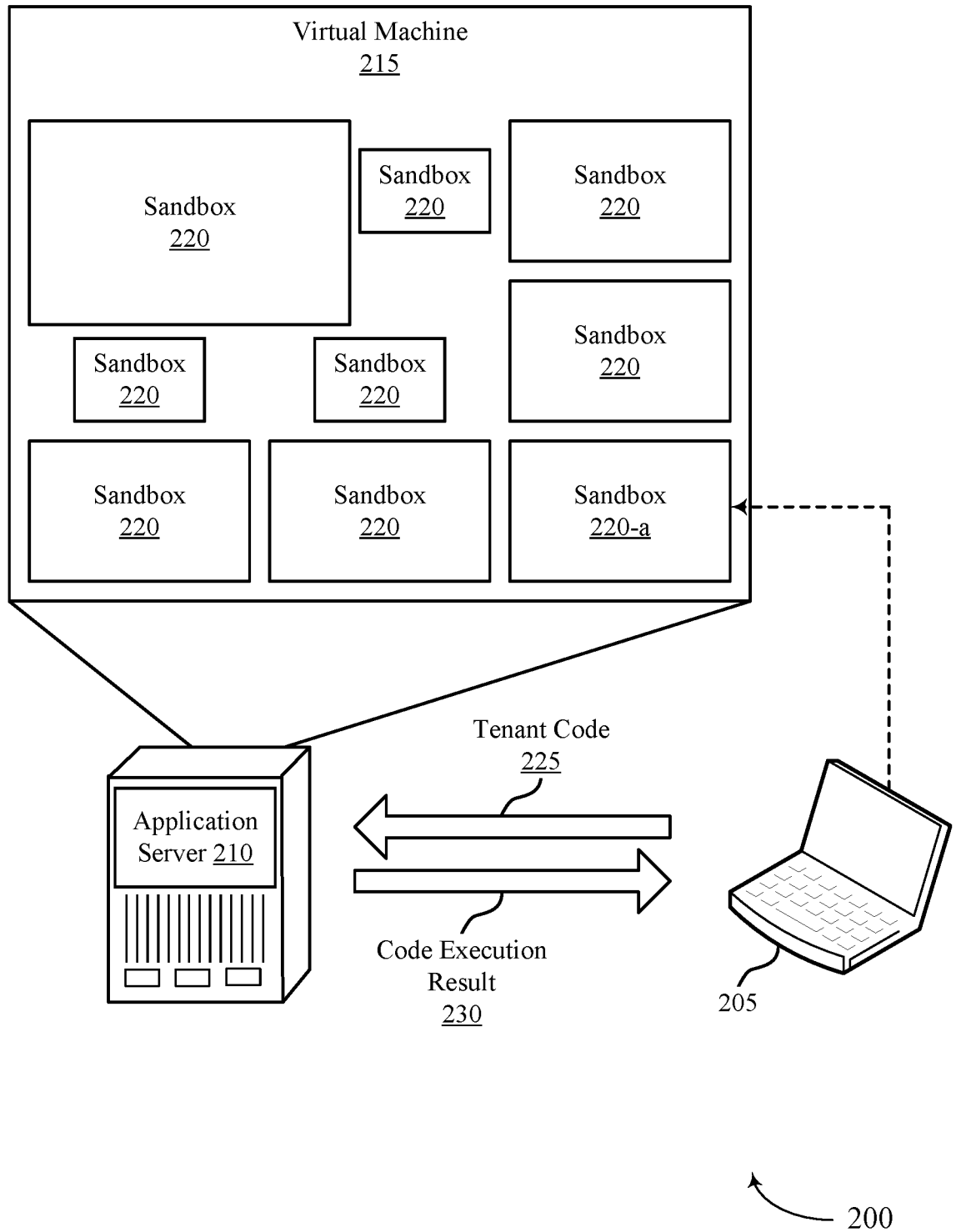
FIGS. 2 and 3 illustrate examples of systems that support usage checks for code running within a secure sub-environment of a virtual machine in accordance with aspects of the present disclosure.

FIG. 2 illustrates an example of a system 200 that supports usage checks for code running within a secure sub-environment of a virtual machine in accordance with aspects of the present disclosure. The system 200 may include a user device 205 and an application server 210. The user device 205 may be an example of a cloud client 105 or a contact 110 as described in FIG. 1. In some cases, the application server 210 may be hosted by a cloud platform 115 as described in FIG. 1. The application server 210 may be an example of a single server, a server cluster, a bare metal machine, a container, or some combination of these.

The application server 210 may host a virtual machine 215 (e.g., one virtual machine 215 may be run per application server 210 in a multi-tenant database system). In some cases, the virtual machine 215 may be an example of a JVM that runs Java programs or other programs that are compiled into Java bytecode. The virtual machine 215 may include one or more secure sub-environments, which may be referred to as sandboxes 220. A sandbox 220 within the virtual machine 215 may be configured to run code provided by a tenant of the application server 210. For example, the sandbox 220-a may be configured for a tenant that operates the user device 205 (e.g., a user operating the user device 205 may be associated with the tenant based on one or more user or tenant identifiers). The tenant may use the user device 205 to execute code and run programs in the sandbox 220-a. In some cases, the sandboxes 220 may be of different sizes, have different resource usage restrictions, or have other varying configurations (e.g., based on tenant-specific access configurations or permissions at the application server 210). In some cases, a new sandbox may be created for a new tenant on the fly. For example, if a tenant provides code to the application server 210, the application server 210 may create a sandbox 220 to run the code on the fly based on receiving the code. In some other examples, if a new tenant subscribes to the application service platform, the application server may create a new sandbox in the virtual machine 215 for the new tenant. In some cases, sandboxes 220 may be created for tenants based on use. For example, sandboxes 220 may be generated as tenants provide code, or sandboxes may eventually be removed from the virtual machine 215 if they are not used frequently.

A sandbox 220 may represent a single isolated execution context. Code executed within a sandbox 220 may be isolated from both the host (e.g., the surrounding virtual machine 215 external to the sandboxes 220) and the other sandboxes 220. The application server 210 may create a separate class loader for a sandbox 220 which has access to a limited set of whitelisted classes from the parent class loader. Other classes may be manually identified as accessible within the sandbox 220 and may be loaded again inside the sandbox 220. This may isolate static variables and class initialization between the parent class loader and the class loader of the sandbox 220.

Though the virtual machine 215 and the sandboxes 220 are isolated, the application server platform may provide an interface for communication between the virtual machine 215 and the sandboxes 220, such as an API. Some types (e.g., class types) in the API may be shared between the virtual machine 215 and the sandboxes 220 and may be used to call between the two. For example, the shared types may be loaded in the host class loader, and the sandbox class loaders may delegate to the host. In some cases, a sandboxed domain for a sandbox 220 may specify the APIs for that sandbox 220. This sandboxed domain may be common across the sandboxes 220 of the virtual machine 215.

Code executed by the virtual machine 215 may be trusted, while code executed in a sandbox 220 may be untrusted. Trusted code may include platform-specific language code or code of other languages provided by an administrative user with proper permissions for executing within the application server. For example, Apex code may be an example of trusted code when provided by any user, while Java code may be considered trusted code if provided by an administrative user with the proper permissions for running Java code (e.g., the administrative user may be trusted to follow the proper security and resource constraints or include resource checks in the non-platform-specific code). Some application servers may restrict tenants to executing trusted code or programs created using a platform-specific language in a sandbox, which may ensure safe execution that does not consume an imbalanced amount of resources. The application server 210, and other application servers described herein, may implement techniques and security mechanisms which enable a tenant to execute untrusted code in the sandbox 220. Thus, the tenant may have full access to functionality of using an unsafe programming language (e.g., Java), and any insecurities that may typically come with the unsafe code may be automatically handled by the application server 210. Using these techniques, the system 200 may support running untrusted code safely and securely within another process. The application server may configure the sandboxes 220 using, for example, a class locator, a parent whitelist, host registration, bytecode rewriting, or any combination thereof.

In some cases, a class loader for a sandbox 220 may provide isolation for code running in the sandbox 220. When the sandbox 220 attempts to load a class, the class loading gets handled by the sandbox class loader based on restrictions of the class. In a first example, classes that are shared between the virtual machine 215 and the sandbox 220 may be delegated to the parent loader (e.g., a class loader for the virtual machine 215). These classes may be type-identical between the virtual machine 215 and the sandbox 220 and may be assignable from both sides. This may include built-in Java types (e.g., "java.*" classes), the API for the application server platform, and any whitelisted paths to host interfaces. In a second example, classes may exist in the parent class loader and be reloaded in the sandbox 220. In this example, the same bytecode may be used from the parent, but a new copy may be loaded in the sandbox 220. This second example may include "javax.*" classes. In a third example, sandbox-specific classes may be provided by a class locator. These classes may be loaded only inside the sandbox. Thus, the sandbox-specific classes may not extend outside the sandbox to other parts of the virtual machine 215. The sandbox-specific classes may be provided by the host at creation of the sandbox 220 or at runtime of a program in the sandbox 220. In some cases, any other classes not included in one of these three examples may be blacklisted and result in an error if called by tenant code 225. This may prevent dangerous or unsafe classes from being called in the sandbox 220.

The application server 210 may implement bytecode rewriting to provide security for the application service platform and the sandboxes 220. The sandbox class loader may handle the rewriting for each class it loads. In some cases, certain classes may be delegated to prevent rewriting. This may be configured at the application server 210 or indicated or requested by the tenant. A class locator may be a host-provided mechanism to inject classes for use in the sandboxes 220. The sandbox class loader may include an ordered list of class locators. In turn, each class loader may be passed the name of a class to be loaded, and the class loader may return with a class file source (e.g., a ClassFileSource) or 'null.' The class file source may support accessing the bytecode for a class and may better handle how the security manager interacts with the class loader. A return of a null value may indicate that the class file cannot be found or does not exist.

In some cases, the application server may use a process-wide security manager. The sandbox security manager may include a thread local flag which indicates whether a current thread is executing in a sandbox 220 or not. For example, the thread local flag may be an example of a bit, where the virtual machine 215 may flip the bit upon entering or exiting execution in a sandbox 220. If the current thread is executing in the sandbox 220, access checks may fail. Otherwise, if the current thread is not executing in the sandbox 220, access checks may succeed. Trusted code may obtain a flag (e.g., a PrivilegedActor flag) that allows the trusted code to leave the sandbox 220 to execute. An example of an access check may include accessing additional classes, resources, or domains that may be restricted for the sandboxes 220 such that one sandbox 220 does not affect other sandboxes 220 or the host.

The application server 210 may utilize a mechanism for the virtual machine 215 to inject code into a sandbox 220. In some cases, the mechanism for injecting code into the sandboxes 220 may be referred to as a host interface. The sandbox class rewriter may handle rewriting the bytecode for security. The application server 210 may instrument the bytecode to enforce limits such as CPU usage limits or heap memory limits. The application server 210 may insert probes (e.g., resource usage checks) on back edges of functions and return statements to check the CPU time. If the CPU time is above a threshold, the application server 210 may cancel execution of the program in the sandbox 220. The application server 210 may also enforce heap limits. The application server 210 may create a shadow copy of local variables. The shadow copies may be linked up with the caller's local frame. In some cases, each shadow copy may include the same information as the corresponding local variable. In other cases, each shadow copy may point to the corresponding local variable or otherwise track the size in memory (e.g., the heap memory overhead) of the corresponding local variable. The application server 210 may add up the heap usage of the shadow copies to determine whether the sandbox 220 has exceeded the heap limit. In some cases, the application server 210 may consider the outgoing argument space when detecting heap usage. In some cases, the application server 210 may rewrite references to a class to redirect the reference to a new class. For example, "java.lang" may not be instrumented based on virtual machine limitations, so the application server 210 may redirect calls to another class with a safer implementation (e.g., a class supporting instrumentation such that security and resource usage checks may be injected during bytecode rewriting).

In some cases, the virtual machine 215 may prevent some classes from being loaded twice. For example, if a class is loaded in the virtual machine 215, that class may be prevented from being loaded in a sandbox 220. The "java.*" classes may be examples of classes which may not be loaded twice. The application server 210 may not support rewriting a class which cannot be loaded twice. While the security manager may be able to restrict actions of these classes, the application server 210 may not be able to enforce limits (e.g., CPU limits or heap limits as described above), as these limits may be injected into bytecode based on support for bytecode instrumentation.

Therefore, the application server 210 may generate a parallel set of classes for classes which do not support multiple loading instances. In an example, "java.lang.String" may map instead to "com.company.corejdk.java.lang.String." The parallel class may include identical, or functionally identical, bytecode to the methods of the replaced class, but the parallel class may be rewritten as static. For example, the parallel class for "java.lang.String" may be a static method class which has functionally identical bytecode. The application server 210 may be able to modify the bytecode of the parallel class to implement resource usage checks. In some cases, the parallel classes may support instrumentation, such that their bytecode can be modified and rewritten. In this way, the compiled tenant code 225 may call one class, but based on the bytecode rewriting, running the tenant code 225 in a sandbox 220 may result in the bytecode pointing to (e.g., calling) a different (e.g., parallel) class to support adding limits or modifications to the class functionality. In some cases, this parallel class may be built dynamically at runtime.

As described herein, there may be a shared interface between the virtual machine 215 and the sandboxes 220, such as the whitelist of classes, which may be called from the sandbox 220 whose implementation was constructed by the host, the virtual machine 215. The host may create other interfaces with the sandbox 220 as well. For example, the host may create an interface (e.g., "turtles.api.Host") for the sandboxes 220 to communicate with the host to perform limit enforcement (e.g., based on resource usage limits). This interface may be loaded in the parent class loader, and the sandbox class loader may delegate to it for class loading. Another interface may include a host access class. The host access class may be loaded into the sandbox 220. The host access class may include a static field, "host," which includes a pointer to the implementation provided by the host. The implementation may be provided by the host when creating a sandbox 220. The implementation code may be callable by any code in the sandbox, where its methods are executed as fully trusted. This may be considered as a possible attack vector when securing code at the application server 210. As such, the application server 210, virtual machine 215, or both may include security checks to mitigate any possible attacks using this mechanism.

In an example, the user device 205 associated with a tenant of the application server 210 may send tenant code 225 to the application server 210 to be run in a sandbox. The application server 210 may already have a sandbox 220 corresponding to the tenant, or the application server may create a sandbox 220 for the tenant based on receiving the tenant code 225 or a request to run the tenant code 225. Sandbox 220-*a* may correspond to the tenant, the user device 205, the tenant code 225, or some combination of these. Accordingly, the application server 210 may run the tenant code 225 in sandbox 220-*a*.

The tenant code 225 may be written in a non-platform-specific programming language. For example, while the virtual machine 215 may execute trusted code without implementing additional security checks and procedures, the virtual machine 215 may implement the techniques described herein to securely run the tenant code 225 in sandbox 220-*a*. For example, the tenant code 225 may be written in Java and may not have default restrictions to execute safely within the sandbox 220-*a*. Therefore, the application server 210 may implement techniques to securely run the tenant code 225 within sandbox 220-*a*. Generally, the application server 210 may implement techniques to prevent the execution of the tenant code 225 from affecting performance in other sandboxes 220, accessing restricted classes or domains, or affecting execution of code at the virtual machine 215.

The tenant code 225 provided by the user device 205 may call a set of classes for execution. In some cases, the sandbox class loader may load the whitelist of classes in sandbox 220-*a*. The sandbox class loader may not delegate to the parent Java class loader. In some cases, the sandbox class loader may block access to everything else in the parent (e.g., the virtual machine 215 external to the sandbox 220-*a*). This may prevent loaded classes in sandbox 220-*a* from accessing anything in the host (e.g., inside of core). In some examples, sandbox 220-*a* may use a class locator to locate additional classes. For example, the class locator may represent classes on disk in a directory, classes stored one or more library files (e.g., JAR files), or classes dynamically generated (e.g., at runtime). The application server 210 may use a security manager for sandbox 220-*a*. The security manager may be toggled on and off at entry points and exit points into sandbox 220-*a*. In some cases, the security manger may be toggled upon entry or exit of any sandbox 220. The security manager may prevent the tenant code 225 from accessing sensitive functions in core Java classes (e.g., by checking a value of the security manager flag to determine whether accessing a function is currently supported during thread execution).

In some cases, the application server 210 may identify calls to unsafe classes in the tenant code 225. For example, the tenant code 225 may call classes which do not support instrumentation. The application server 210 may replace these calls with calls to parallel classes that do support instrumentation, such that the application server 210 can inject bytecode into the bytecode of the tenant code 225. The application server 210 may then generate bytecode for the tenant code 225. The application server 210 may inject resource usage checks into the generated bytecode. These resource usage checks may be examples of server protection checks. The application server 210 may perform a validation of the bytecode of the tenant code 225. If the bytecode of the tenant code 225 passes the validation, the application server 210 may run the program for the user device 205 in sandbox 220-a.

In some cases, executing the code may involve an execution engine of the virtual machine 215 converting the bytecode into executable machine code. During execution, the application server 210 (e.g., via the virtual machine 215 or sandbox 220-a) may use the injected resource usage checks to monitor resource usage of the execution process. If a resource usage check identifies a resource usage for executing the code that surpasses a resource threshold (e.g., a common threshold, a tenant-specific threshold, etc. corresponding to the CPU time, the heap memory usage, or both), the code execution may be halted prior to completion of executing the code. In some cases, the application server 230 may send a code execution result 230 to the user device 205 indicating the resource overflow. In other cases, if the code executes successfully without exceeding a resource threshold, the application server 230 may transmit a code execution result 230 to the user device 205 (e.g., indicating successful execution, one or more output values of executing the tenant code 225, etc.).

Figure 3:
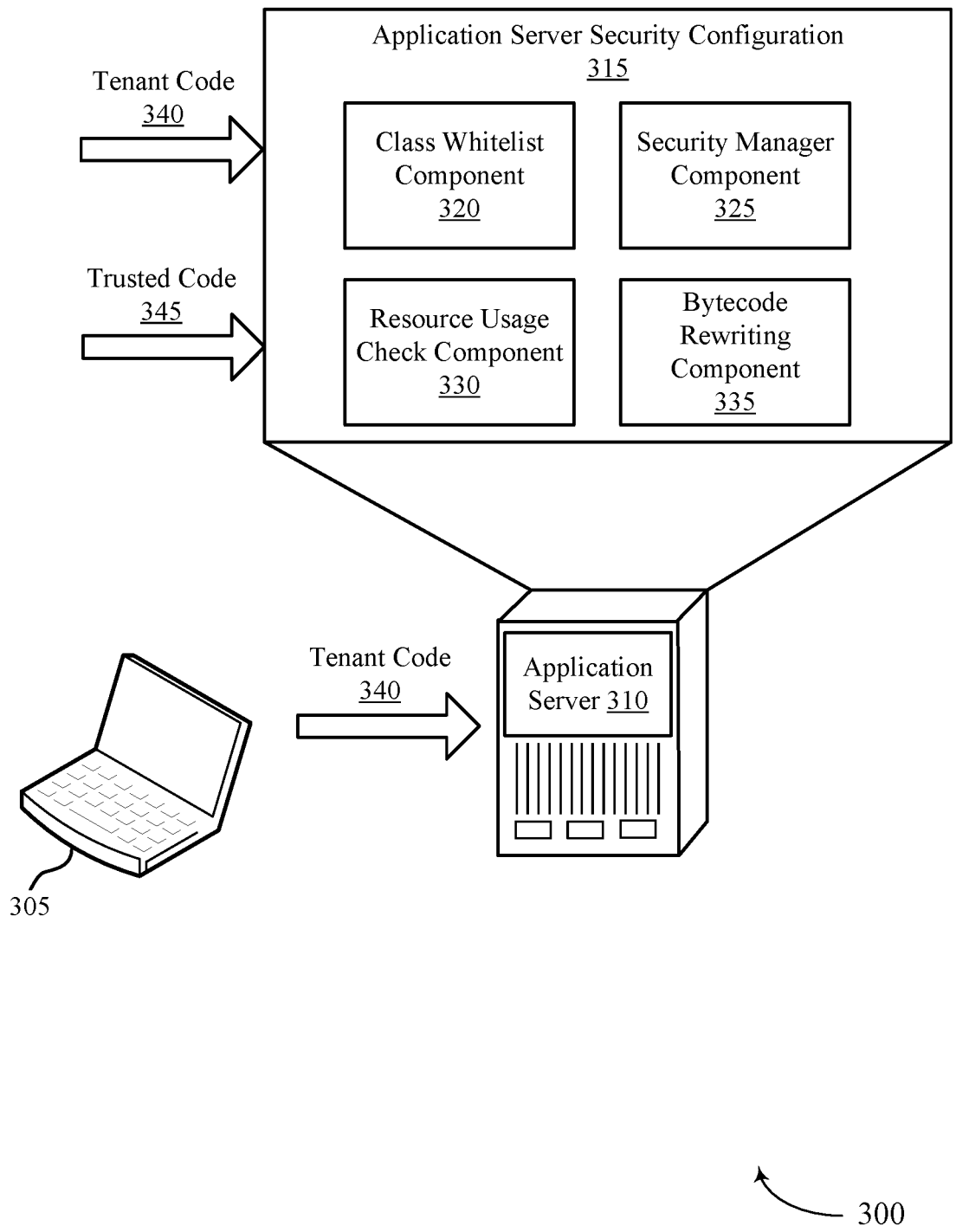

FIG. 3 illustrates an example of a system 300 that supports usage checks for code running within a secure sub-environment of a virtual machine in accordance with aspects of the present disclosure. The system 300 may include an application server 310, which may be an example of an application server 210 as described in FIG. 2. The system 300 may additionally include a user device 305, such as a cloud client 105, a contact 110, or a user device 205 as described with reference to FIGS. 1 and 2. The application server 310 may include one or more components for securely running tenant code 340 in a sub-environment of a virtual machine. In some cases, the application server 310 may support all of the functionality described herein. In other cases, the application server 310 may support a subset of the functionality described herein (e.g., based on the needs of the multi-tenant environment supported by the application server 310).

The application server 310 may host an application server platform by using a virtual machine to execute tenant-provided codes and programs. In some cases, the virtual machine may include one or more sub-environments, where each tenant of the application server 310 is assigned one or more of the sub-environments to run programs in an isolated environment. For example, a first sandbox of the virtual machine may execute code for a first tenant, and a second sandbox of the virtual machine may execute code for a second tenant. Execution of the code from the first tenant in the first sandbox may not disrupt or affect execution of the code from the second tenant in the second sandbox based on the sandboxes being isolated and resource usage for each sandbox being tracked and maintained below certain thresholds. Furthermore, execution of the code in any of the sandboxes may not affect or negatively impact the hosting virtual machine.

The application server 310 may be configured to execute both trusted and untrusted code. Untrusted code may be, for example, Java code. Java code may not automatically enforce restrictions for class access, memory usage, or CPU usage. Therefore, the application server 310 may implement technique to securely run untrusted code, like Java code, in sandboxes of the virtual machine hosted by the application server 310. A user device 305 associated with a tenant may provide the untrusted code (e.g., tenant code 340) to the application server 310.

The application server 310 may include an application server security configuration 315, which may include one or more components for securing tenant code 340 or otherwise untrusted code. The application server security configuration 315 may include a class whitelist component 320, a security manager component 325, a resource usage check component 330, a bytecode rewriting component 335, or any combination thereof. The application server 310 may receive tenant code 340. The tenant code 340 may be written in Java or another programming language which is considered unsafe for the application server 310. The application server 310 may implement techniques to secure the tenant code 340 before running the tenant code 340 in a sandbox corresponding to the tenant.

For example, the class whitelist component 320 may load a whitelist of classes that can be called by the tenant code 340. In some cases, the class whitelist component 320 may use a sandbox class loader to load the whitelist of classes in the sandbox. The sandbox class loader may not delegate to the parent Java class loader. In some cases, the sandbox class loader may block access to everything else in the parent (e.g., besides the whitelisted set of classes). This may prevent loaded classes in the sandbox from accessing anything in the host (e.g., inside of core).

In some examples, the application server 310 may use a class locator to locate additional classes. The class locator may inject classes into the sandboxes of the application server 310. The class locator may be analogous to a segment of the class path. The sandbox class loader may include an ordered list of the class locators. Each class locator may be passed the name of the class to be loaded and return with a class file source. For example, the class locator may represent classes on disk in a directory, may represent classes from one or more library files (e.g., JAR files), or may be dynamically generated for a set of classes. Each class locator may turn a fully qualified class name into a handle in bytecode or a null value.

The security manager component 325 may include a security manager. The security manager may include a thread local flag indicating whether or not the current thread is executing in the sandbox or not. For example, at runtime, the thread local flag for the security manager may be toggled on and off at entry points and exit points into the sandbox. The security manager may prevent the tenant code 340 from accessing sensitive functions in core Java classes. If the current thread is executing in the sandbox (e.g., security manager is toggled on), then all access checks may fail, restricting the tenant code's access to non-tenant specific data or information. If the current thread is not executing in the sandbox (e.g., security manager is toggled off), then the access checks may succeed. For example, trusted code 345 prepared by an administrative user and running at the host level of the virtual machine may be granted access to non-tenant specific data and/or certain amounts of data (e.g., non-privileged data) across tenants. In some cases, the application server 310 may receive trusted code 345 (e.g., from a tenant). The trusted code 345 may be written in a programming language which is trusted by the application server security configuration 315. The trusted code 345 may obtain a PrivilegedActor indicator that enables the trusted code 345 to leave the sandbox to execute.

In some cases, the application server 310 may identify calls to unsafe classes (e.g., classes not containing safeguards against resource overuse) in the tenant code 340. For example, the tenant code 340 may call classes which do not support instrumentation. The application server 310 may replace these calls with calls to parallel classes that do support instrumentation, such that the bytecode rewriting component 335 can inject bytecode into the bytecode of the tenant code 340. The application server 310 may then generate bytecode for the tenant code 340, where the generated bytecode includes the injected resource usage checks. The resource usage check component 330 may determine resource usage limits for the tenant code 340. The application server 310 may set resource usage limits such that one tenant's code does not use too many resources of the hosting virtual machine, as that may impact performance for other sandboxes. For example, these resource usage limits may be based on the size of a tenant (e.g., the number of users, user devices, or licenses associated with that tenant), an access level of the tenant (e.g., a tenant may pay more to receive additional resource usage at the application server 310), a size of the application server 310, a time of day for executing code, a number of concurrent code executions running at the application server 310, or some combination of these or other relevant features. In some cases, the resource usage thresholds may be common across all tenants, while in other cases the resource usage thresholds may be tenant-specific. Additionally or alternatively, the resource usage thresholds may be pre-configured at the application server 310 or may dynamically change based on any number of parameters (e.g., a time of day, a number of tenants accessing the application server 310, resource usage of other processes running on the application server 310 or in the virtual machine, etc.).

The bytecode rewriting component 335 may inject resource usage checks into the generated bytecode of the tenant code 340. The bytecode rewriting component 335 may insert probes on the back edges and return statements of the bytecode of the tenant code 340. Upon executing one of the probes, the resource usage check component 330 may determine whether the corresponding sandbox has a CPU usage time which is above a threshold. For example, inefficient tenant code 340 may execute for extended periods of time (e.g., due to nonoptimal coding, an infinite loop, etc.), locking up processing resources of the application server 310 during execution and limiting support for other tenants. Additionally or alternatively, the bytecode rewriting component 335 may rewrite the bytecode to enforce a heap limit. The bytecode rewriting component 335 may create a shadow copy of local variables in the tenant code 340. The shadow copies may be linked up with the caller's local frame. The resource usage check component 330 may determine the current or total heap memory used in the sandbox to run the tenant code 340 based on the shadow copies. The resource usage check component 330 may compare the used heap memory to a threshold. If any of the resource usages exceed a corresponding threshold, the application server 310 may stop executing the tenant code 340 (e.g., throwing an exception, breaking the execution, etc.). For example, if the CPU time usage is too large or the heap memory usage is too high, the application server 310 may cease execution of the tenant code 340 and, in some cases, notify the tenant of the failed execution due to the execution overhead exceeding one or more specified resource limits.

In some cases, the application server 310 may perform an additional validation of the bytecode of the tenant code 340 using a bytecode verifier. If the bytecode of the tenant code 340 passes the additional validation, the application server 310 may run the program for the user device 305 in the sandbox. If, during execution, any of the resource usage checks fail, the application server 310 may stop execution of the tenant's program prior to completing the execution process. When stopping execution, the applications server 310 may additionally release resources previously being used for the executing to be used by other processes running at the application server 310 (e.g., for other tenants).

The tenant code 340 may run within a transaction at the application server 310. As such, the tenant code 340 may modify and track objects in process memory that have not yet been written to disk, react to triggers within a transaction, etc. In this way, the tenant code 340 may affect what gets committed to disk (e.g., using a shared database connection, such as a Java database connection (JDBC), of the virtual machine) as a result of a successful transaction. Using such a process, the application server 310 may support a common transaction execution model across multiple different languages within a sandbox. For example, the application server 310 may support a multi-tenant virtual machine running Java code within a transaction using one or more of the techniques described herein. Additionally or alternatively, the application server 310 may support compiling Apex code into a programming language that may be run within a sandbox using one or more of the techniques described herein, allowing for the de-coupling of the Apex code and the runtime operations.

Figure 4:
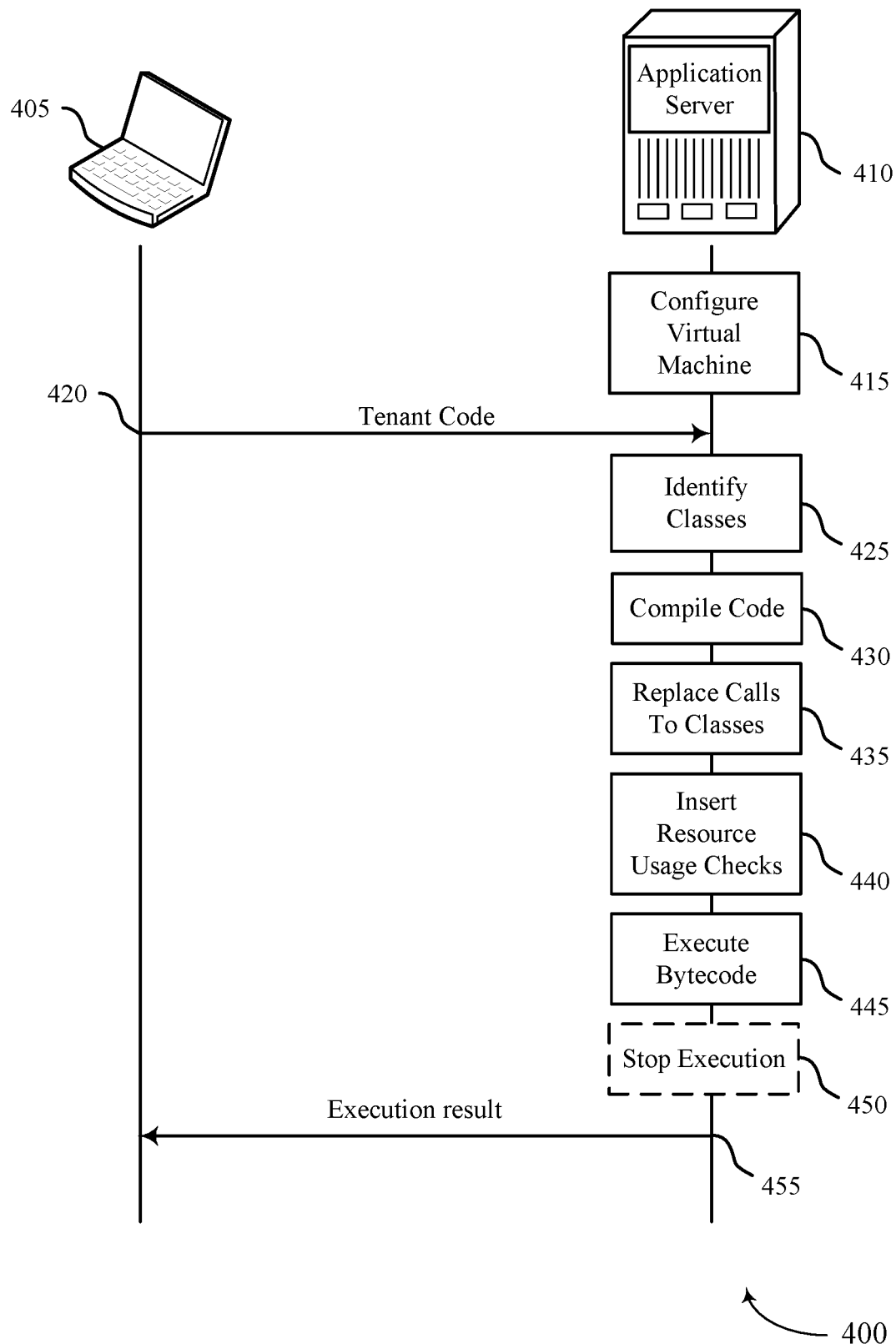
FIGS. 4 and 5 illustrate examples of process flows that support usage checks for code running within a secure sub-environment of a virtual machine in accordance with aspects of the present disclosure.

FIG. 4 illustrates an example of a process flow 400 that supports usage checks for code running within a secure sub-environment of a virtual machine in accordance with aspects of the present disclosure. The process flow 400 may include a user device 405 and an application server 410. The user device 405 may be an example of a user device 205 or 305 as described in FIGS. 2 and 3. The application server 410 may be an example of an application server 210 or 310 as described in FIGS. 2 and 3. Alternative examples of the following may be implemented, where some steps are performed in a different order than described or are not performed at all. In some cases, steps may include additional features not mentioned below, or further steps may be added.

At 415, the application server 410 may configure a virtual machine including an isolated virtual environment configured to execute code for a tenant of the application server 410. The isolated virtual environment may be an example of a sandbox as described herein. The user device 405 may be associated with the tenant of the application server 410. In some cases, the isolated virtual environment may be one of multiple isolated virtual environments. For example, different tenants of the application server 410 may be associated with different isolated virtual environments (e.g., secure sub-environments) of the virtual machine, which may be an example of a JVM. If a tenant has multiple programs to run, that tenant may, in some cases, be associated with more than one of the sandboxes. In some cases, the size of a sandbox may dynamically change to handle execution of one or more programs for a tenant (e.g., up to a certain limit).

At 420, the user device 405 may provide code to the application server 410. In some cases, the application server 410 may create the sandbox based on receiving the code from the user device 405. The code may be for a tenant of the application server 410. In some cases, the code may be an example of unsafe or untrusted code. For example, the code provided by the user device 405 may be written in Java, or another non-platform-specific programming language, that does not enforce secure execution or runtime resource limits. The application server 410 may implement techniques to securely execute the code in the sandbox configured for the tenant. In some cases, the application server 410 may identify a tenant associated with received executable code based on the sending user device 405 or a tenant identifier, and the application server 410 may allocate the code to an isolated virtual environment or spin up an isolated virtual environment according to the identified tenant.

At 425, the application server 410 may identify one or more classes called in the code (i.e., the tenant code received at 420), where the one or more classes include instrumentation restrictions for the isolated virtual environment. In some cases, the one or more classes may be restricted from being called twice in the virtual machine. For example, the one or more classes may be of class "java.*". These classes may not support bytecode instrumentation and therefore may not support the application server 410 rewriting their bytecode to enforce resource usage restrictions and security configurations.

The application server 410 may compile the code into bytecode at 430, where the bytecode is interpretable by the virtual machine. At 435, the application server 410 may replace one or more first calls to the one or more classes in the bytecode that do not support instrumentation with one or more second calls to one or more parallel classes, where the one or more parallel classes support instrumentation in the isolated virtual environment. In some cases, the one or more parallel classes may be static classes. The one or more parallel classes may support instrumentation such that the application server 410 can insert resource usage checks into the bytecode of the one or more parallel classes. In some cases, the application server 410 may additionally load a designated set of classes in the isolated virtual environment, where the designated set of classes support instrumentation in the isolated virtual environment. The application server 410 may block access of the isolated virtual environment to classes outside of the designated set of classes and the one or more parallel classes. In some cases, the designated set of classes may be an example of a whitelist of classes as described herein.

At 440, the application server 410 may insert one or more resource usage checks into the bytecode. In some cases, the application server 410 may insert the one or more resource usage checks into the bytecode based on the one or more parallel classes (e.g., by performing instrumentation on the bytecode generated for the parallel classes). The resource usage checks may enforce CPU usage limits, heap memory usage limits, or both. The application server 410 may enforce the resource usage limits to prevent the sandbox from affecting code execution performance of code in other sandboxes or in the hosting virtual machine.

At 445, the application server 410 may execute the bytecode (e.g., where the executing involving executing at least a first portion of the bytecode) with the one or more parallel classes and the one or more resource usage checks in the isolated virtual environment. For example, the application server 410 may run the program provided by the tenant in the sandbox configured for the tenant. In some cases, the application server 410 may toggle a security bit based on whether an execution thread of the virtual machine is executing within the isolated virtual environment or within a portion of the virtual machine external to the isolated virtual environment. The security bit may be an example of the security manager as described herein. The application server 410 may track whether code is executing in a sandbox or in the host based on the security bit (e.g., based on a codepoint of the security bit due to the bit toggling, where a zero codepoint indicates a first environment for code execution, such as the host-level of the virtual machine, and a non-zero codepoint indicates a second environment for code execution, such as internal to a tenant-specific sandbox). In some cases, the application server 410 may validate or verify the bytecode prior to executing the bytecode. In some cases, the validation or verification may assist the application server 410 in detecting any remaining issues with the bytecode prior to executing the bytecode.

At 450, the application server 410 may determine whether to stop the executing based on the one or more resource usage checks and a number of resources used by the isolated virtual environment for executing the bytecode. In some cases, the application server 410 may determine that a CPU usage associated with executing the bytecode exceeds a CPU usage threshold associated with the isolated virtual environment based on the CPU usage check. The application server 410 may stop the executing based on determining that the CPU usage associated with executing the bytecode exceeds the CPU usage threshold. Additionally, or alternatively, the application server 410 may determine that a heap usage associated with executing the bytecode exceeds a heap usage threshold associated with the isolated virtual environment based on the heap usage check. The application server 410 may stop the executing based on determining that the heap usage associated with executing the bytecode exceeds the heap usage threshold. In some cases, to track the heap usage of the sandbox, the application server 410 may create a respective shadow copy for each local variable instantiated during execution of the bytecode and track the heap usage associated with executing the bytecode based on a number of created shadow copies or sizes of the created shadow copies. For example, the application server 410 may total up the memory used by the shadow copies and use this value to estimate or determine the memory used to execute the code in the sandbox.

At 455, the application server 410 may, in some cases, send an execution result to the user device 405. For example, the bytecode may successfully execute, and the application server 410 may run the tenant's program successfully. The application server 410 may run the program and send any expected results of a successfully executed program to the user device 405. If the application server 410 determines to stop executing the bytecode, the application server 410 may send an indicator of the decision to the user device 405. For example, the application server 410 may stop the executing based on the one or more resource usage checks and transmit, to the user device 405, an execution failure message based on stopping the executing. In some cases, this execution failure message may indicate a reason for the execution failure.

Figure 5:
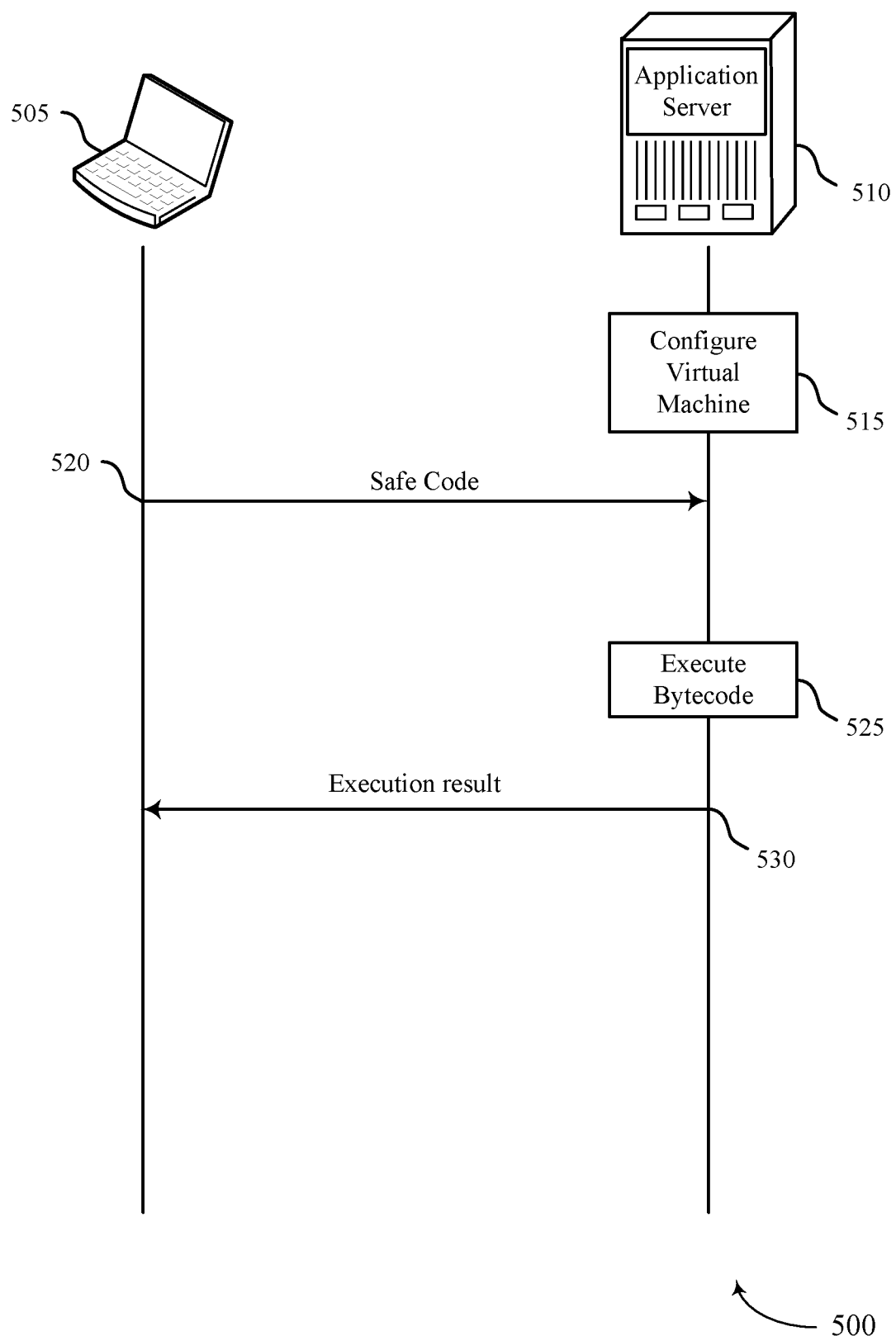

FIG. 5 illustrates an example of a process flow 500 that supports usage checks for code running within a secure sub-environment of a virtual machine in accordance with aspects of the present disclosure. The process flow 500 may include a user device 505, which may be an example of a user device 205, 305, or 405 as described in FIGS. 2 through 4. The process flow 500 may also include an application server 510, which may be an example of an application server 210, 310, or 410 as described in FIGS. 2 through 4. The techniques of the process flow 500 may be performed in addition to, or as an alterative to, the techniques described in the process flow 400 of FIG. 4. For example, an application server configured to run unsafe code in a sandbox for a tenant may also be capable of running safe code for the tenant or an administrative user. Alternative examples of the following may be implemented, where some steps are performed in a different order than described or are not performed at all. In some cases, steps may include additional features not mentioned below, or further steps may be added.

At 515, the application server 510 may configure a virtual machine including an isolated virtual environment configured to execute code for a tenant of the application server. The isolated virtual environment may be an example of a sandbox as described herein. In some cases, the isolated virtual environment may be one of multiple isolated virtual environments. For example, each tenant of the application server 510 may be configured one or more of the multiple sandboxes. In some cases, a subset of the tenants of the application server 510 may be allocated a sandbox based on which tenants are currently running code at the application server 510.

At 520, the user device 505 may provide code to the application server 410. In some cases, the application server 510 may create the sandbox based on receiving the code from the user device 505. The code may be for a tenant of the application server 510. In this example, the code provided by the user device 505 may be an example of safe code or trusted code. In some cases, safe code may be written in a programming language which is associated with the application server platform provided by the application server 510. The application server 510 may, then, trust that execution of the safe code does not pose a security or resource usage threat.

The application server 510 may generate bytecode for the safe code and execute the bytecode at 525. Where unsafe code may be confined to a sandbox, the application server 510 may, in some cases, execute the safe code outside of the sandbox or support the safe code to access domains or classes outside of the sandbox. Alternatively, the application server 510 may generate bytecode for the safe code (e.g., platform-specific code, such as Apex) and run the safe code as byte code in the sandbox (e.g., rather than using an interpreter). In this case, the execution of both safe code and unsafe code may be performed similar to the process described with reference to FIG. 4. At 530, the application server 510 may send an execution result to the user device 505. In some cases, the execution result may be an expected result of successfully executing the code (e.g., running the program), or the execution result may be an error notification if the code does not successfully execute.

Figure 6:
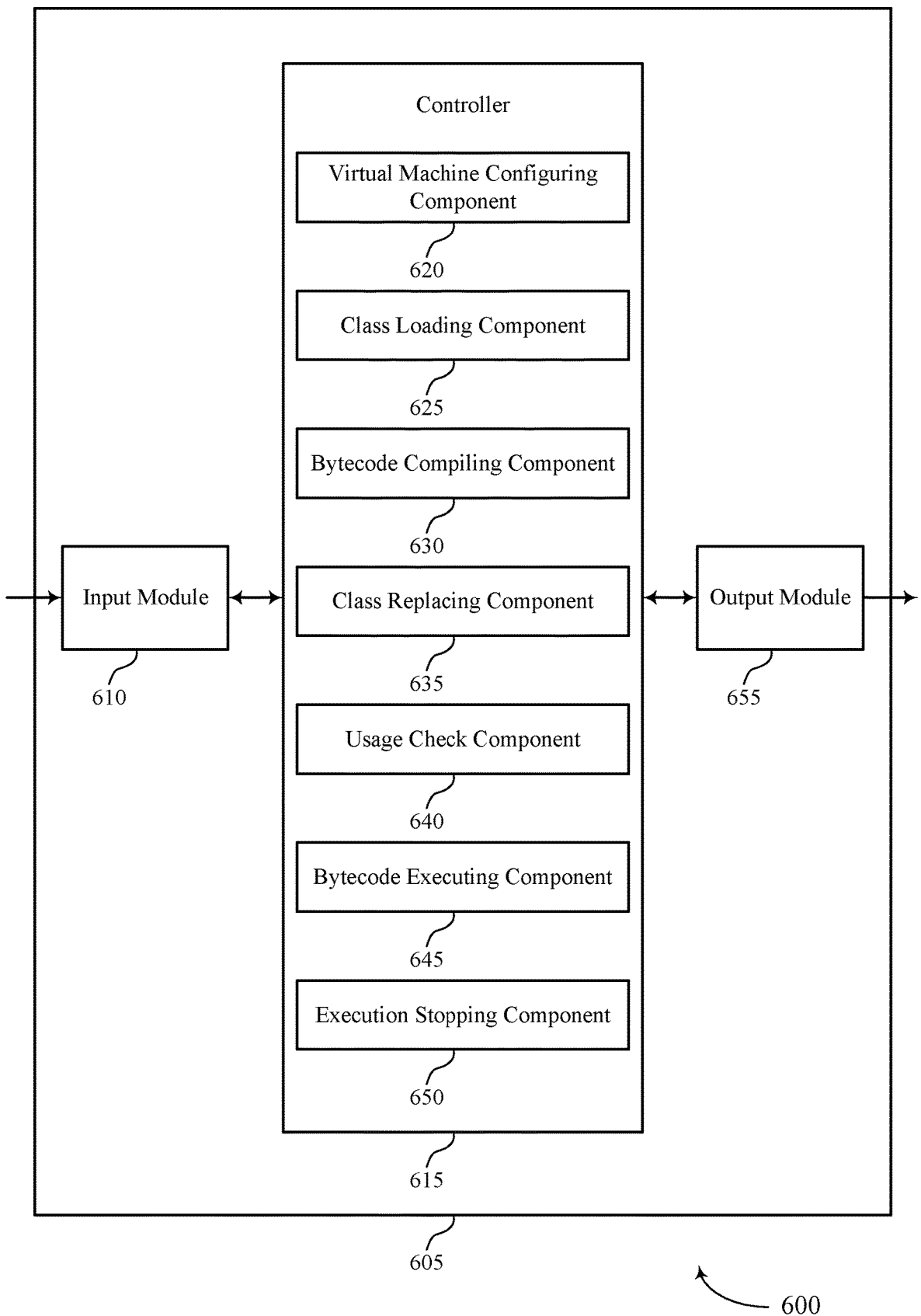
FIG. 6 shows a block diagram of an apparatus that supports usage checks for code running within a secure sub-environment of a virtual machine in accordance with aspects of the present disclosure.

FIG. 6 shows a block diagram 600 of an apparatus 605 that supports usage checks for code running within a secure sub-environment of a virtual machine in accordance with aspects of the present disclosure. The apparatus 605 may include an input module 610, a controller 615, and an output module 655. The apparatus 605 may also include a processor. Each of these components may be in communication with one another (e.g., via one or more buses). In some cases, the apparatus 605 may be an example of a user terminal, an application server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the controller 615 to support usage checks for code running within a secure sub-environment of a virtual machine. In some cases, the input module 610 may be a component of an input/output (I/O) controller 815 as described with reference to FIG. 8.

The controller 615 may include a virtual machine configuring component 620, a class loading component 625, a bytecode compiling component 630, a class replacing component 635, a usage check component 640, a bytecode executing component 645, and an execution stopping component 650. The controller 615 may be an example of aspects of the controller 705 or 810 described with reference to FIGS. 7 and 8.

The controller 615 and/or at least some of its various sub-components may be implemented in hardware, software executed by a processor, firmware, or any combination thereof. If implemented in software executed by a processor, the functions of the controller 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The controller 615 and/or at least some of its various sub-components may be physically located at various positions, including being distributed such that portions of functions are implemented at different physical locations by one or more physical devices. In some examples, the controller 615 and/or at least some of its various sub-components may be a separate and distinct component in accordance with various aspects of the present disclosure. In other examples, the controller 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The virtual machine configuring component 620 may configure, at an application server, a virtual machine including an isolated virtual environment configured to execute code for a tenant of the application server. The class loading component 625 may identify one or more classes called in the code, where the one or more classes include instrumentation restrictions for the isolated virtual environment. The bytecode compiling component 630 (e.g., a compiler) may compile the code into bytecode, where the bytecode is interpretable by the virtual machine.

The class replacing component 635 may replace one or more first calls to the one or more classes in the bytecode with one or more second calls to one or more parallel classes, where the one or more parallel classes support instrumentation in the isolated virtual environment. The usage check component 640 may insert one or more resource usage checks into the bytecode based on the one or more parallel classes. The bytecode executing component 645 (e.g., an execution engine) may execute the bytecode with the one or more parallel classes and the one or more resource usage checks in the isolated virtual environment. The execution stopping component 650 may determine whether to stop the executing based on the one or more resource usage checks and a number of resources used by the isolated virtual environment for executing the bytecode.

The output module 655 may manage output signals for the apparatus 605. For example, the output module 655 may receive signals from other components of the apparatus 605, such as the controller 615, and may transmit these signals to other components or devices. In some specific examples, the output module 655 may transmit output signals for display in a user interface, for storage in a database or data store, for further processing at a server or server cluster, or for any other processes at any number of devices or systems. In some cases, the output module 655 may be a component of an I/O controller 815 as described with reference to FIG. 8.

Figure 7:
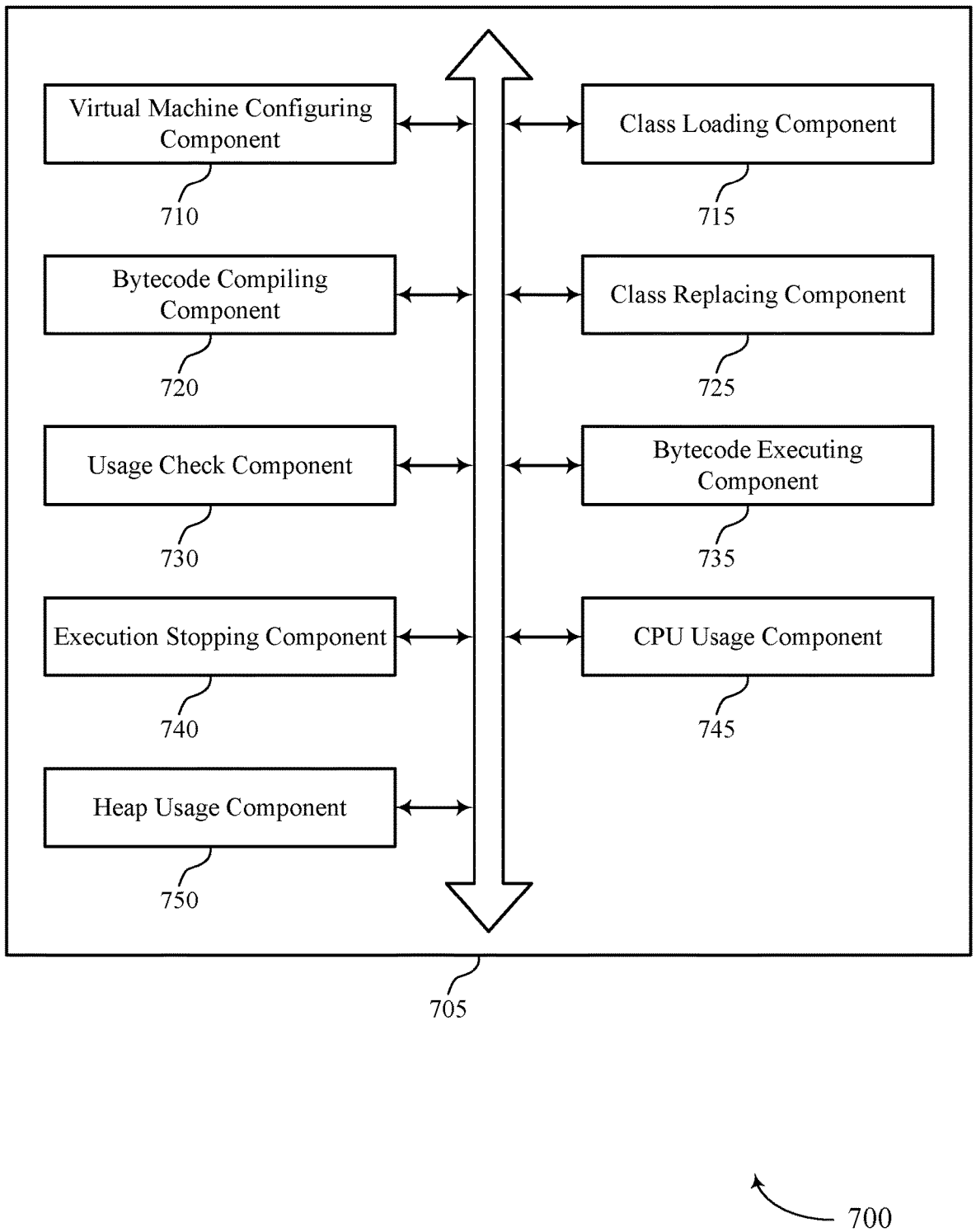
FIG. 7 shows a block diagram of a controller that supports usage checks for code running within a secure sub-environment of a virtual machine in accordance with aspects of the present disclosure.

FIG. 7 shows a block diagram 700 of a controller 705 that supports usage checks for code running within a secure sub-environment of a virtual machine in accordance with aspects of the present disclosure. The controller 705 may be an example of aspects of a controller 615 or a controller 810 described herein and may be a component of an application server. The controller 705 may include a virtual machine configuring component 710, a class loading component 715, a bytecode compiling component 720, a class replacing component 725, a usage check component 730, a bytecode executing component 735, an execution stopping component 740, a CPU usage component 745, and a heap usage component 750. Each of these modules may communicate, directly or indirectly, with one another (e.g., via one or more buses).

The virtual machine configuring component 710 may configure, at an application server, a virtual machine including an isolated virtual environment configured to execute code for a tenant of the application server. In some examples, the virtual machine configuring component 710 may receive, at the application server, additional code to execute for an additional tenant of the application server.

In some examples, the virtual machine configuring component 710 may create, in the virtual machine, an additional isolated virtual environment configured to execute the additional code for the additional tenant based on the receiving. In some cases, the isolated virtual environment is one of a set of isolated virtual environments. In some cases, each isolated virtual environment of the set of isolated virtual environments corresponds to a respective tenant of a multi-tenant system associated with the application server.

The class loading component 715 may identify one or more classes called in the code, where the one or more classes include instrumentation restrictions for the isolated virtual environment. In some examples, the class loading component 715 may load a designated set of classes in the isolated virtual environment, where the designated set of classes supports instrumentation in the isolated virtual environment. In some examples, the class loading component 715 may block access of the isolated virtual environment to classes outside of the designated set of classes and the one or more parallel classes.

In some examples, the class loading component 715 may restrict access within the isolated virtual environment to tenant-specific data and tenant-specific code for other tenants of the application server. In some examples, the class loading component 715 may configure a class locator configured to load virtual environment-specific classes for the isolated virtual environment, where the code identifies the virtual environment-specific classes based on the class locator.

The bytecode compiling component 720 may compile the code into bytecode, where the bytecode is interpretable by the virtual machine. The class replacing component 725 may replace one or more first calls to the one or more classes in the bytecode with one or more second calls to one or more parallel classes, where the one or more parallel classes support instrumentation in the isolated virtual environment. In some cases, the one or more parallel classes include static classes.

The usage check component 730 may insert one or more resource usage checks into the bytecode based on the one or more parallel classes. In some examples, the usage check component 730 may stop the executing based on the one or more resource usage checks In some examples, the usage check component 730 may transmit, to a user device, an execution failure message based on stopping the executing.

The bytecode executing component 735 may execute the bytecode with the one or more parallel classes and the one or more resource usage checks in the isolated virtual environment. In some examples, the bytecode executing component 735 may toggle a security bit based on whether an execution thread of the virtual machine is executing within the isolated virtual environment or within a portion of the virtual machine external to the isolated virtual environment.

In some examples, the bytecode executing component 735 may detect a back edge or a return statement of the bytecode, where the one or more resource usage checks are inserted into the bytecode based on the detecting. In some examples, the bytecode executing component 735 may verify the bytecode prior to executing the bytecode. The execution stopping component 740 may determine whether to stop the executing based on the one or more resource usage checks and a number of resources used by the isolated virtual environment for executing the bytecode.

The CPU usage component 745 may determine that a CPU usage associated with executing the bytecode exceeds a CPU usage threshold associated with the isolated virtual environment based on the CPU usage check. In some examples, the CPU usage component 745 may stop the executing based on the determining that the CPU usage associated with executing the bytecode exceeds the CPU usage threshold.

The heap usage component 750 may determine that a heap usage associated with executing the bytecode exceeds a heap usage threshold associated with the isolated virtual environment based on the heap usage check. In some examples, the heap usage component 750 may stop the executing based on the determining that the heap usage associated with executing the bytecode exceeds the heap usage threshold. In some examples, the heap usage component 750 may create a respective shadow copy for each local variable instantiated during execution of the bytecode. In some examples, the heap usage component 750 may track the heap usage associated with executing the bytecode based on a number of created shadow copies.

Figure 8:
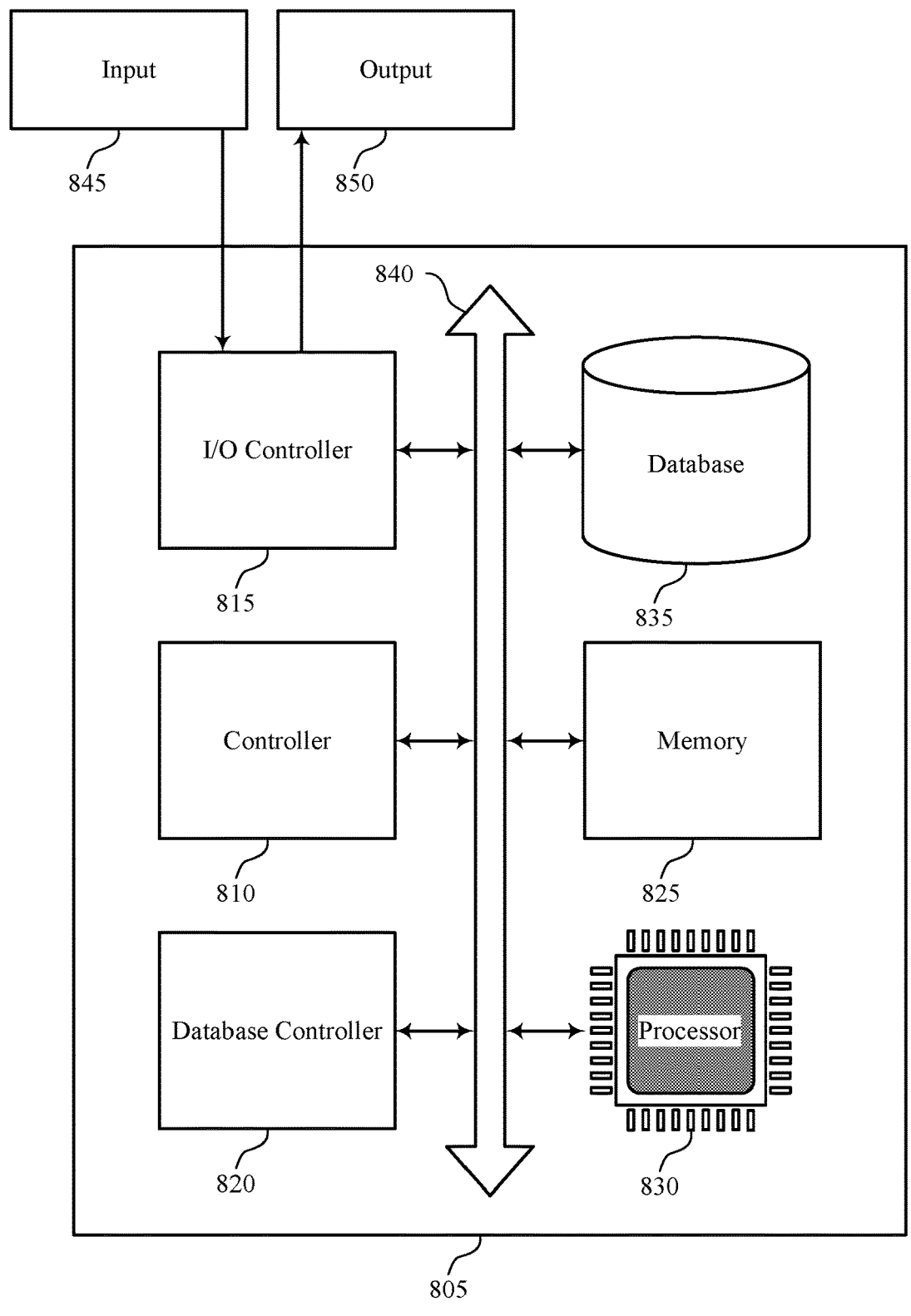
FIG. 8 shows a diagram of a system including a device that supports usage checks for code running within a secure sub-environment of a virtual machine in accordance with aspects of the present disclosure.

FIG. 8 shows a diagram of a system 800 including a device 805 that supports usage checks for code running within a secure sub-environment of a virtual machine in accordance with aspects of the present disclosure. The device 805 may be an example of or include the components of an application server or an apparatus 605 as described herein. The device 805 may include components for bi-directional data communications including components for transmitting and receiving communications, including a controller 810, an I/O controller 815, a database controller 820, memory 825, a processor 830, and a database 835. These components may be in electronic communication via one or more buses (e.g., bus 840).

The controller 810 may be an example of a controller 615 or 705 as described herein. For example, the controller 810 may perform any of the methods or processes described above with reference to FIGS. 6 and 7. In some cases, the controller 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting usage checks for code running within a secure sub-environment of a virtual machine).

Figure 9:
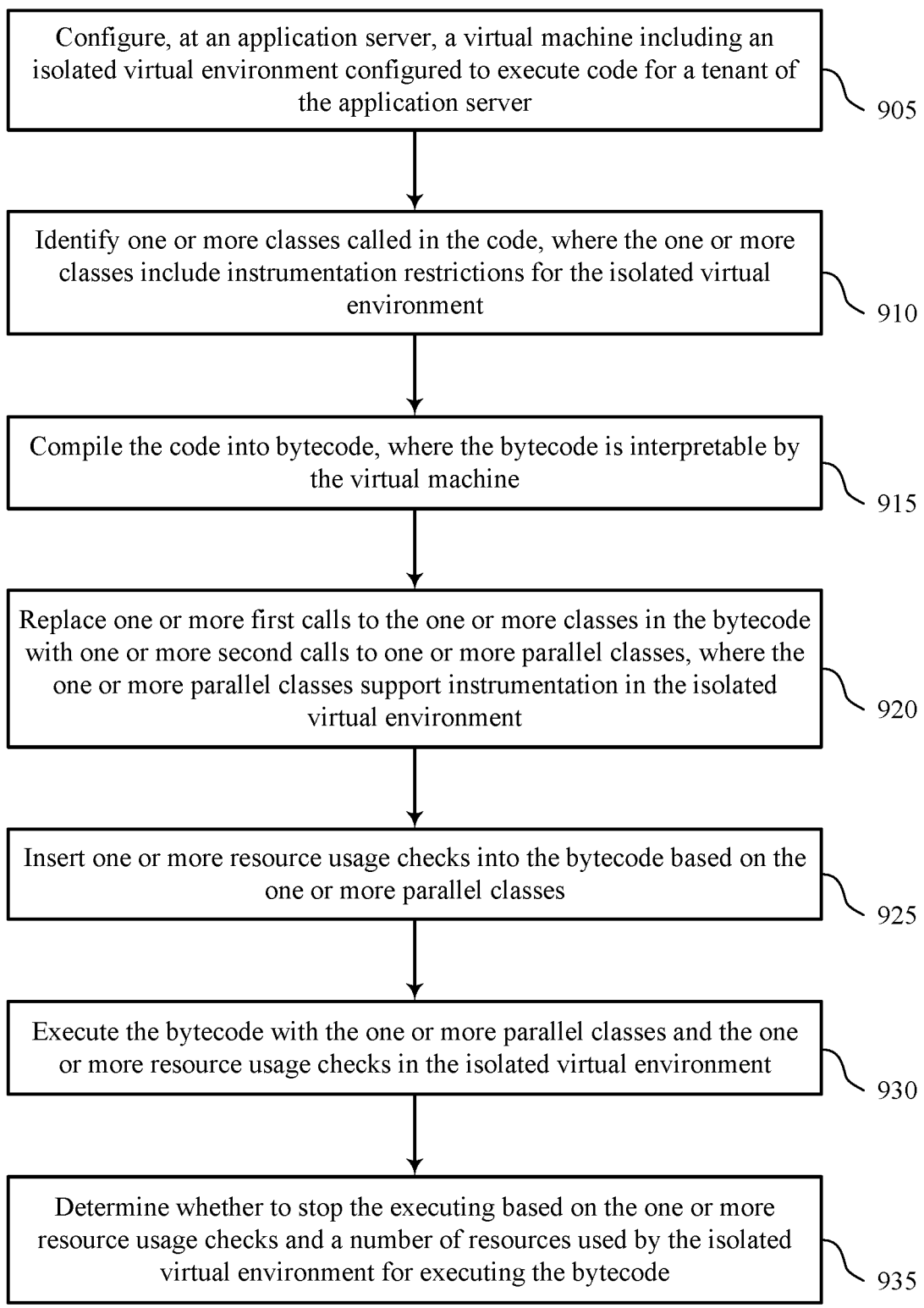
FIGS. 9 through 12 show flowcharts illustrating methods that support usage checks for code running within a secure sub-environment of a virtual machine in accordance with aspects of the present disclosure.

FIG. 9 shows a flowchart illustrating a method 900 that supports usage checks for code running within a secure sub-environment of a virtual machine in accordance with aspects of the present disclosure. The operations of method 900 may be implemented by an application server or its components as described herein. For example, the operations of method 900 may be performed by a controller as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 905, the application server may configure, at the application server, a virtual machine including an isolated virtual environment configured to execute code for a tenant of the application server. The operations of 905 may be performed according to the methods described herein. In some examples, aspects of the operations of 905 may be performed by a virtual machine configuring component as described with reference to FIGS. 6 through 8.

At 910, the application server may identify one or more classes called in the code, where the one or more classes include instrumentation restrictions for the isolated virtual environment. The operations of 910 may be performed according to the methods described herein. In some examples, aspects of the operations of 910 may be performed by a class loading component as described with reference to FIGS. 6 through 8.

At 915, the application server may compile the code into bytecode, where the bytecode is interpretable by the virtual machine. The operations of 915 may be performed according to the methods described herein. In some examples, aspects of the operations of 915 may be performed by a bytecode compiling component as described with reference to FIGS. 6 through 8.

At 920, the application server may replace one or more first calls to the one or more classes in the bytecode with one or more second calls to one or more parallel classes, where the one or more parallel classes support instrumentation in the isolated virtual environment. The operations of 920 may be performed according to the methods described herein. In some examples, aspects of the operations of 920 may be performed by a class replacing component as described with reference to FIGS. 6 through 8.

At 925, the application server may insert one or more resource usage checks into the bytecode based on the one or more parallel classes. The operations of 925 may be performed according to the methods described herein. In some examples, aspects of the operations of 925 may be performed by a usage check component as described with reference to FIGS. 6 through 8.

At 930, the application server may execute the bytecode with the one or more parallel classes and the one or more resource usage checks in the isolated virtual environment. The operations of 930 may be performed according to the methods described herein. In some examples, aspects of the operations of 930 may be performed by a bytecode executing component as described with reference to FIGS. 6 through 8.

At 935, the application server may determine whether to stop the executing based on the one or more resource usage checks and a number of resources used by the isolated virtual environment for executing the bytecode. The operations of 935 may be performed according to the methods described herein. In some examples, aspects of the operations of 935 may be performed by an execution stopping component as described with reference to FIGS. 6 through 8.

Figure 10:
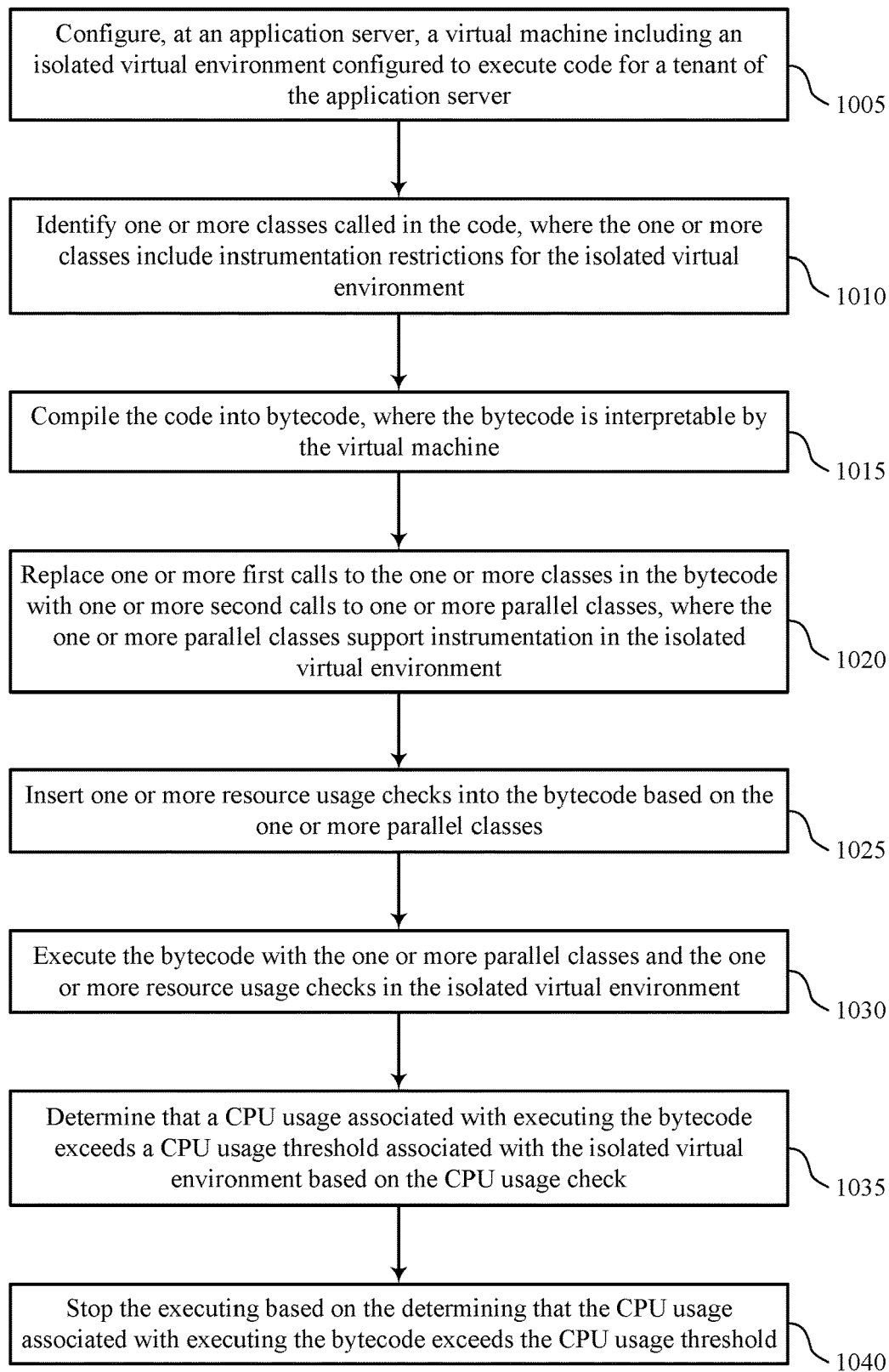

FIG. 10 shows a flowchart illustrating a method 1000 that supports usage checks for code running within a secure sub-environment of a virtual machine in accordance with aspects of the present disclosure. The operations of method 1000 may be implemented by an application server or its components as described herein. For example, the operations of method 1000 may be performed by a controller as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1005, the application server may configure a virtual machine including an isolated virtual environment configured to execute code for a tenant of the application server. The operations of 1005 may be performed according to the methods described herein. In some examples, aspects of the operations of 1005 may be performed by a virtual machine configuring component as described with reference to FIGS. 6 through 8.

At 1010, the application server may identify one or more classes called in the code, where the one or more classes include instrumentation restrictions for the isolated virtual environment. The operations of 1010 may be performed according to the methods described herein. In some examples, aspects of the operations of 1010 may be performed by a class loading component as described with reference to FIGS. 6 through 8.

At 1015, the application server may compile the code into bytecode, where the bytecode is interpretable by the virtual machine. The operations of 1015 may be performed according to the methods described herein. In some examples, aspects of the operations of 1015 may be performed by a bytecode compiling component as described with reference to FIGS. 6 through 8.

At 1020, the application server may replace one or more first calls to the one or more classes in the bytecode with one or more second calls to one or more parallel classes, where the one or more parallel classes support instrumentation in the isolated virtual environment. The operations of 1020 may be performed according to the methods described herein. In some examples, aspects of the operations of 1020 may be performed by a class replacing component as described with reference to FIGS. 6 through 8.

At 1025, the application server may insert one or more resource usage checks into the bytecode based on the one or more parallel classes. The operations of 1025 may be performed according to the methods described herein. In some examples, aspects of the operations of 1025 may be performed by a usage check component as described with reference to FIGS. 6 through 8.

At 1030, the application server may execute the bytecode with the one or more parallel classes and the one or more resource usage checks in the isolated virtual environment. The operations of 1030 may be performed according to the methods described herein. In some examples, aspects of the operations of 1030 may be performed by a bytecode executing component as described with reference to FIGS. 6 through 8.

At 1035, the application server may determine that a CPU usage associated with executing the bytecode exceeds a CPU usage threshold associated with the isolated virtual environment based on the CPU usage check. The operations of 1035 may be performed according to the methods described herein. In some examples, aspects of the operations of 1035 may be performed by a CPU usage component as described with reference to FIGS. 6 through 8.

At 1040, the application server may stop the executing based on the determining that the CPU usage associated with executing the bytecode exceeds the CPU usage threshold. The operations of 1040 may be performed according to the methods described herein. In some examples, aspects of the operations of 1040 may be performed by a CPU usage component as described with reference to FIGS. 6 through 8.

Figure 11:
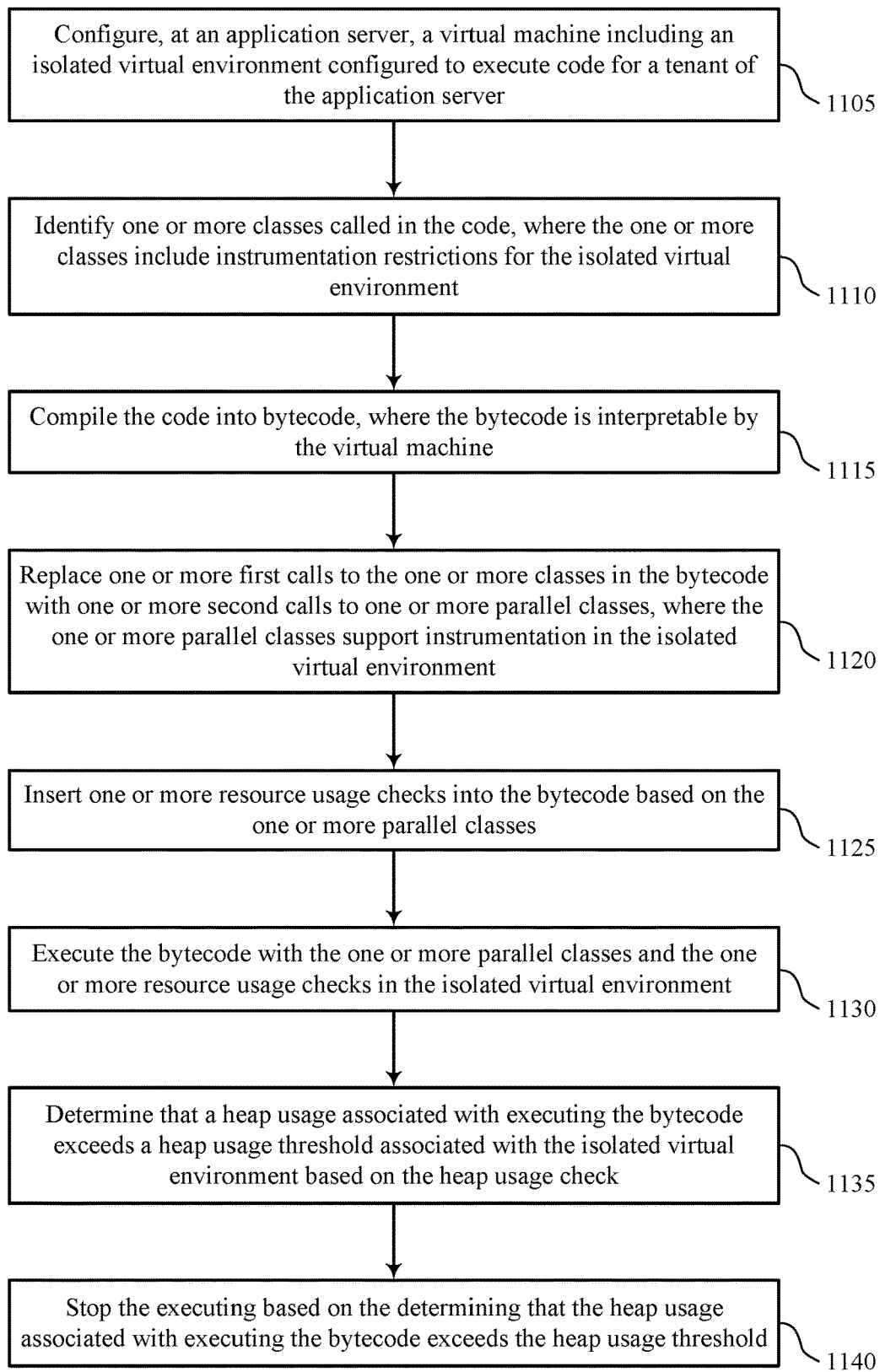

FIG. 11 shows a flowchart illustrating a method 1100 that supports usage checks for code running within a secure sub-environment of a virtual machine in accordance with aspects of the present disclosure. The operations of method 1100 may be implemented by an application server or its components as described herein. For example, the operations of method 1100 may be performed by a controller as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1105, the application server may configure a virtual machine including an isolated virtual environment configured to execute code for a tenant of the application server. The operations of 1105 may be performed according to the methods described herein. In some examples, aspects of the operations of 1105 may be performed by a virtual machine configuring component as described with reference to FIGS. 6 through 8.

At 1110, the application server may identify one or more classes called in the code, where the one or more classes include instrumentation restrictions for the isolated virtual environment. The operations of 1110 may be performed according to the methods described herein. In some examples, aspects of the operations of 1110 may be performed by a class loading component as described with reference to FIGS. 6 through 8.

At 1115, the application server may compile the code into bytecode, where the bytecode is interpretable by the virtual machine. The operations of 1115 may be performed according to the methods described herein. In some examples, aspects of the operations of 1115 may be performed by a bytecode compiling component as described with reference to FIGS. 6 through 8.

At 1120, the application server may replace one or more first calls to the one or more classes in the bytecode with one or more second calls to one or more parallel classes, where the one or more parallel classes support instrumentation in the isolated virtual environment. The operations of 1120 may be performed according to the methods described herein. In some examples, aspects of the operations of 1120 may be performed by a class replacing component as described with reference to FIGS. 6 through 8.

At 1125, the application server may insert one or more resource usage checks into the bytecode based on the one or more parallel classes. The operations of 1125 may be performed according to the methods described herein. In some examples, aspects of the operations of 1125 may be performed by a usage check component as described with reference to FIGS. 6 through 8.

At 1130, the application server may execute the bytecode with the one or more parallel classes and the one or more resource usage checks in the isolated virtual environment. The operations of 1130 may be performed according to the methods described herein. In some examples, aspects of the operations of 1130 may be performed by a bytecode executing component as described with reference to FIGS. 6 through 8.

At 1135, the application server may determine that a heap usage associated with executing the bytecode exceeds a heap usage threshold associated with the isolated virtual environment based on the heap usage check. The operations of 1135 may be performed according to the methods described herein. In some examples, aspects of the operations of 1135 may be performed by a heap usage component as described with reference to FIGS. 6 through 8.

At 1140, the application server may stop the executing based on the determining that the heap usage associated with executing the bytecode exceeds the heap usage threshold. The operations of 1140 may be performed according to the methods described herein. In some examples, aspects of the operations of 1140 may be performed by a heap usage component as described with reference to FIGS. 6 through 8.

Figure 12:
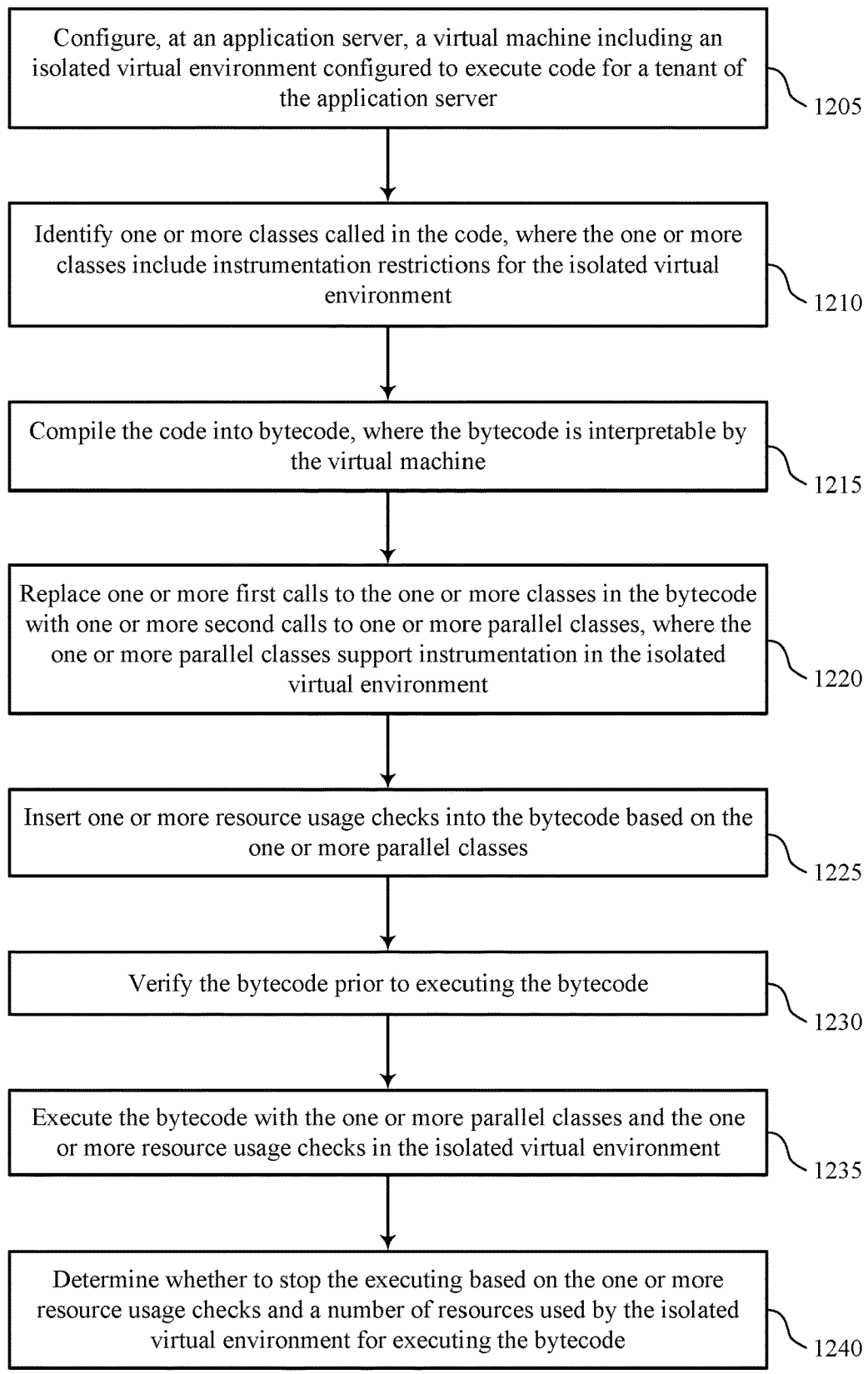

FIG. 12 shows a flowchart illustrating a method 1200 that supports usage checks for code running within a secure sub-environment of a virtual machine in accordance with aspects of the present disclosure. The operations of method 1200 may be implemented by an application server or its components as described herein. For example, the operations of method 1200 may be performed by a controller as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1205, the application server may configure, at an application server, a virtual machine including an isolated virtual environment configured to execute code for a tenant of the application server. The operations of 1205 may be performed according to the methods described herein. In some examples, aspects of the operations of 1205 may be performed by a virtual machine configuring component as described with reference to FIGS. 6 through 8.

At 1210, the application server may identify one or more classes called in the code, where the one or more classes include instrumentation restrictions for the isolated virtual environment. The operations of 1210 may be performed according to the methods described herein. In some examples, aspects of the operations of 1210 may be performed by a class loading component as described with reference to FIGS. 6 through 8.

At 1215, the application server may compile the code into bytecode, where the bytecode is interpretable by the virtual machine. The operations of 1215 may be performed according to the methods described herein. In some examples, aspects of the operations of 1215 may be performed by a bytecode compiling component as described with reference to FIGS. 6 through 8.

At 1220, the application server may replace one or more first calls to the one or more classes in the bytecode with one or more second calls to one or more parallel classes, where the one or more parallel classes support instrumentation in the isolated virtual environment. The operations of 1220 may be performed according to the methods described herein. In some examples, aspects of the operations of 1220 may be performed by a class replacing component as described with reference to FIGS. 6 through 8.

At 1225, the application server may insert one or more resource usage checks into the bytecode based on the one or more parallel classes. The operations of 1225 may be performed according to the methods described herein. In some examples, aspects of the operations of 1225 may be performed by a usage check component as described with reference to FIGS. 6 through 8.

At 1230, the application server may verify the bytecode prior to executing the bytecode. The operations of 1230 may be performed according to the methods described herein. In some examples, aspects of the operations of 1230 may be performed by a bytecode executing component as described with reference to FIGS. 6 through 8.

At 1235, the application server may execute the bytecode with the one or more parallel classes and the one or more resource usage checks in the isolated virtual environment. The operations of 1235 may be performed according to the methods described herein. In some examples, aspects of the operations of 1235 may be performed by a bytecode executing component as described with reference to FIGS. 6 through 8.

At 1240, the application server may determine whether to stop the executing based on the one or more resource usage checks and a number of resources used by the isolated virtual environment for executing the bytecode. The operations of 1240 may be performed according to the methods described herein. In some examples, aspects of the operations of 1240 may be performed by an execution stopping component as described with reference to FIGS. 6 through 8.

A method for data processing is described. The method may include configuring, at an application server, a virtual machine including an isolated virtual environment configured to execute code for a tenant of the application server, identifying one or more classes called in the code, where the one or more classes include instrumentation restrictions for the isolated virtual environment, compiling the code into bytecode, where the bytecode is interpretable by the virtual machine, replacing one or more first calls to the one or more classes in the bytecode with one or more second calls to one or more parallel classes, where the one or more parallel classes support instrumentation in the isolated virtual environment, inserting one or more resource usage checks into the bytecode based on the one or more parallel classes, executing the bytecode with the one or more parallel classes and the one or more resource usage checks in the isolated virtual environment, and determining whether to stop the executing based on the one or more resource usage checks and a number of resources used by the isolated virtual environment for executing the bytecode.

An apparatus for data processing is described. The apparatus may include a processor, memory in electronic communication with the processor, and instructions stored in the memory. The instructions may be executable by the processor to cause the apparatus to configure, at an application server, a virtual machine including an isolated virtual environment configured to execute code for a tenant of the application server, identify one or more classes called in the code, where the one or more classes include instrumentation restrictions for the isolated virtual environment, compile the code into bytecode, where the bytecode is interpretable by the virtual machine, replace one or more first calls to the one or more classes in the bytecode with one or more second calls to one or more parallel classes, where the one or more parallel classes support instrumentation in the isolated virtual environment, insert one or more resource usage checks into the bytecode based on the one or more parallel classes, execute the bytecode with the one or more parallel classes and the one or more resource usage checks in the isolated virtual environment, and determine whether to stop the executing based on the one or more resource usage checks and a number of resources used by the isolated virtual environment for executing the bytecode.

Another apparatus for data processing is described. The apparatus may include means for configuring, at an application server, a virtual machine including an isolated virtual environment configured to execute code for a tenant of the application server, identifying one or more classes called in the code, where the one or more classes include instrumentation restrictions for the isolated virtual environment, compiling the code into bytecode, where the bytecode is interpretable by the virtual machine, replacing one or more first calls to the one or more classes in the bytecode with one or more second calls to one or more parallel classes, where the one or more parallel classes support instrumentation in the isolated virtual environment, inserting one or more resource usage checks into the bytecode based on the one or more parallel classes, executing the bytecode with the one or more parallel classes and the one or more resource usage checks in the isolated virtual environment, and determining whether to stop the executing based on the one or more resource usage checks and a number of resources used by the isolated virtual environment for executing the bytecode.

A non-transitory computer-readable medium storing code for data processing is described. The code may include instructions executable by a processor to configure, at an application server, a virtual machine including an isolated virtual environment configured to execute code for a tenant of the application server, identify one or more classes called in the code, where the one or more classes include instrumentation restrictions for the isolated virtual environment, compile the code into bytecode, where the bytecode is interpretable by the virtual machine, replace one or more first calls to the one or more classes in the bytecode with one or more second calls to one or more parallel classes, where the one or more parallel classes support instrumentation in the isolated virtual environment, insert one or more resource usage checks into the bytecode based on the one or more parallel classes, execute the bytecode with the one or more parallel classes and the one or more resource usage checks in the isolated virtual environment, and determine whether to stop the executing based on the one or more resource usage checks and a number of resources used by the isolated virtual environment for executing the bytecode.

In some examples of the method, apparatuses, and non-transitory computer-readable medium described herein, the one or more resource usage checks include a CPU usage check. Some examples of the method, apparatuses, and non-transitory computer-readable medium described herein may further include operations, features, means, or instructions for determining that a CPU usage associated with executing the bytecode exceeds a CPU usage threshold associated with the isolated virtual environment based on the CPU usage check and stopping the executing based on the determining that the CPU usage associated with executing the bytecode exceeds the CPU usage threshold.

In some examples of the method, apparatuses, and non-transitory computer-readable medium described herein, the one or more resource usage checks include a heap usage check. Some examples of the method, apparatuses, and non-transitory computer-readable medium described herein may further include operations, features, means, or instructions for determining that a heap usage associated with executing the bytecode exceeds a heap usage threshold associated with the isolated virtual environment based on the heap usage check and stopping the executing based on the determining that the heap usage associated with executing the bytecode exceeds the heap usage threshold.

Some examples of the method, apparatuses, and non-transitory computer-readable medium described herein may further include operations, features, means, or instructions for creating a respective shadow copy for each local variable instantiated during execution of the bytecode and tracking the heap usage associated with executing the bytecode based on a number of created shadow copies.

Some examples of the method, apparatuses, and non-transitory computer-readable medium described herein may further include operations, features, means, or instructions for toggling a security bit based on whether an execution thread of the virtual machine may be executing within the isolated virtual environment or within a portion of the virtual machine external to the isolated virtual environment.

Some examples of the method, apparatuses, and non-transitory computer-readable medium described herein may further include operations, features, means, or instructions for loading a designated set of classes in the isolated virtual environment, where the designated set of classes supports instrumentation in the isolated virtual environment and blocking access of the isolated virtual environment to classes outside of the designated set of classes and the one or more parallel classes.

Some examples of the method, apparatuses, and non-transitory computer-readable medium described herein may further include operations, features, means, or instructions for detecting a back edge or a return statement of the bytecode, where the one or more resource usage checks may be inserted into the bytecode based on the detecting.

Some examples of the method, apparatuses, and non-transitory computer-readable medium described herein may further include operations, features, means, or instructions for verifying the bytecode prior to executing the bytecode.

In some examples of the method, apparatuses, and non-transitory computer-readable medium described herein, the one or more parallel classes include static classes.

In some examples of the method, apparatuses, and non-transitory computer-readable medium described herein, the isolated virtual environment may be one of a set of isolated virtual environments.

In some examples of the method, apparatuses, and non-transitory computer-readable medium described herein, each isolated virtual environment of the set of isolated virtual environments corresponds to a respective tenant of a multi-tenant system associated with the application server.

Some examples of the method, apparatuses, and non-transitory computer-readable medium described herein may further include operations, features, means, or instructions for receiving, at the application server, additional code to execute for an additional tenant of the application server and creating, in the virtual machine, an additional isolated virtual environment configured to execute the additional code for the additional tenant based on the receiving.

Some examples of the method, apparatuses, and non-transitory computer-readable medium described herein may further include operations, features, means, or instructions for restricting access within the isolated virtual environment to tenant-specific data and tenant-specific code for other tenants of the application server.

Some examples of the method, apparatuses, and non-transitory computer-readable medium described herein may further include operations, features, means, or instructions for configuring a class locator configured to load virtual environment-specific classes for the isolated virtual environment, where the code identifies the virtual environment-specific classes based on the class locator.

Some examples of the method, apparatuses, and non-transitory computer-readable medium described herein may further include operations, features, means, or instructions for stopping the executing based on the one or more resource usage checks and transmitting, to a user device, an execution failure message based on stopping the executing.

It should be noted that the methods described above describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
configuring, at an application server, a virtual machine comprising an isolated virtual environment configured to execute code for a tenant of the application server;
identifying one or more first classes called in the code, wherein the one or more first classes comprise instrumentation restrictions for the isolated virtual environment and do not support instrumentation via insertion of one or more resource usage checks;
compiling the code into bytecode, wherein the bytecode is interpretable by the virtual machine;
replacing one or more first calls to the one or more first classes in the bytecode with one or more second calls to one or more parallel classes, wherein the one or more parallel classes comprise different classes than the one or more first classes and support both instrumentation, via insertion of one or more resource usage checks and one or more limitations to class functionality as compared to the one or more first classes in the isolated virtual environment;
inserting one or more resource usage checks into one or more portions of the bytecode generated for the one or more parallel classes based at least in part on the one or more parallel classes;

executing the bytecode with the one or more parallel classes and the one or more resource usage checks in the isolated virtual environment; and determining whether to stop the executing based at least in part on the one or more resource usage checks and a number of resources used by the isolated virtual environment for executing the bytecode.

2. The method of claim 1, wherein the one or more resource usage checks comprise a central processing unit (CPU) usage check, the method further comprising:

determining that a CPU usage associated with executing the bytecode exceeds a CPU usage threshold associated with the isolated virtual environment based at least in part on the CPU usage check; and stopping the executing based at least in part on the determining that the CPU usage associated with executing the bytecode exceeds the CPU usage threshold.

3. The method of claim 1, wherein the one or more resource usage checks comprise a heap usage check, the method further comprising:

determining that a heap usage associated with executing the bytecode exceeds a heap usage threshold associated with the isolated virtual environment based at least in part on the heap usage check; and stopping the executing based at least in part on the determining that the heap usage associated with executing the bytecode exceeds the heap usage threshold.

4. The method of claim 3, further comprising:

creating a respective shadow copy for each local variable instantiated during execution of the bytecode; and tracking the heap usage associated with executing the bytecode based at least in part on a number of created shadow copies.

5. The method of claim 1, further comprising:

toggling a security bit based at least in part on whether an execution thread of the virtual machine is executing within the isolated virtual environment or within a portion of the virtual machine external to the isolated virtual environment.

6. The method of claim 1, further comprising:

loading a designated set of classes in the isolated virtual environment, wherein the designated set of classes supports instrumentation in the isolated virtual environment; and blocking access of the isolated virtual environment to classes outside of the designated set of classes and the one or more parallel classes.

7. The method of claim 1, further comprising:

detecting a back edge or a return statement of the bytecode, wherein the one or more resource usage checks are inserted into the bytecode based at least in part on the detecting.

8. The method of claim 1, further comprising:

verifying the bytecode prior to executing the bytecode.

9. The method of claim 1, wherein the one or more parallel classes comprise static classes.

10. The method of claim 1, wherein the isolated virtual environment is one of a plurality of isolated virtual environments.

11. The method of claim 10, wherein each isolated virtual environment of the plurality of isolated virtual environments corresponds to a respective tenant of a multi-tenant system associated with the application server.

12. The method of claim 1, further comprising:

receiving, at the application server, additional code to execute for an additional tenant of the application server; and creating, in the virtual machine, an additional isolated virtual environment configured to execute the additional code for the additional tenant based at least in part on the receiving.

13. The method of claim 1, further comprising:

restricting access within the isolated virtual environment to tenant-specific data and tenant-specific code for other tenants of the application server.

14. The method of claim 1, further comprising:

configuring a class locator configured to load virtual environment-specific classes for the isolated virtual environment, wherein the code identifies the virtual environment-specific classes based at least in part on the class locator.

15. The method of claim 1, further comprising:

stopping the executing based at least in part on the one or more resource usage checks; and transmitting, to a user device, an execution failure message based at least in part on stopping the executing.

16. An apparatus for data processing, comprising: a processor, memory in electronic communication with the processor; and instructions stored in the memory and executable by the processor to cause the apparatus to:

configure, at an application server, a virtual machine comprising an isolated virtual environment configured to execute code for a tenant of the application server;

identify one or more first classes called in the code, wherein the one or more first classes comprise instrumentation restrictions for the isolated virtual environment and do not support instrumentation via insertion of one or more resource usage checks;

compile the code into bytecode, wherein the bytecode is interpretable by the virtual machine;

replace one or more first calls to the one or more first classes in the bytecode with one or more second calls to one or more parallel classes, wherein the one or more parallel classes comprise different classes than the one or more first classes and support both instrumentation, via insertion of one or more resource usage checks and one or more limitations to class functionality as compared to the one or more first classes, in the isolated virtual environment;

insert one or more resource usage checks into one or more portions of the bytecode generated for the one or more parallel classes based at least in part on the one or more parallel classes;

execute the bytecode with the one or more parallel classes and the one or more resource usage checks in the isolated virtual environment; and determine whether to stop the executing based at least in part on the one or more resource usage checks and a number of resources used by the isolated virtual environment for executing the bytecode.

17. The apparatus of claim 16, wherein the one or more resource usage checks comprise a central processing unit (CPU) usage check, and the instructions are further executable by the processor to cause the apparatus to:

determine that a CPU usage associated with executing the bytecode exceeds a CPU usage threshold associated with the isolated virtual environment based at least in part on the CPU usage check; and stop the executing based at least in part on the determining that the CPU usage associated with executing the bytecode exceeds the CPU usage threshold.

18. The apparatus of claim 16, wherein the one or more resource usage checks comprise a heap usage check, and the instructions are further executable by the processor to cause the apparatus to:
- determine that a heap usage associated with executing the bytecode exceeds a heap usage threshold associated with the isolated virtual environment based at least in part on the heap usage check; and
- stop the executing based at least in part on the determining that the heap usage associated with executing the bytecode exceeds the heap usage threshold.

19. The apparatus of claim 16, wherein the instructions are further executable by the processor to cause the apparatus to:
- toggle a security bit based at least in part on whether an execution thread of the virtual machine is executing within the isolated virtual environment or within a portion of the virtual machine external to the isolated virtual environment.

20. A non-transitory computer-readable medium storing executable code for data processing, the executable code comprising instructions executable by a processor to:
- configure, at an application server, a virtual machine comprising an isolated virtual environment configured to execute code for a tenant of the application server;
- identify one or more first classes called in the code, wherein the one or more first classes comprise instrumentation restrictions for the isolated virtual environment and do not support instrumentation via insertion of one or more resource usage checks;
- compile the code into bytecode, wherein the bytecode is interpretable by the virtual machine;
- replace one or more first calls to the one or more first classes in the bytecode with one or more second calls to one or more parallel classes, wherein the one or more parallel classes comprise different classes than the one or more first classes and support both instrumentation, via insertion of one or more resource usage checks and one or more limitations to class functionality as compared to the one or more first classes, in the isolated virtual environment;
- insert one or more resource usage checks into one or more portions of the bytecode generated for the one or more parallel classes based at least in part on the one or more parallel classes;
- execute the bytecode with the one or more parallel classes and the one or more resource usage checks in the isolated virtual environment; and
- determine whether to stop the executing based at least in part on the one or more resource usage checks and a number of resources used by the isolated virtual environment for executing the bytecode.

* * * * *